United States Patent
Sangu et al.

(10) Patent No.: US 12,440,921 B2
(45) Date of Patent: Oct. 14, 2025

(54) LASER PROCESSING APPARATUS AND LASER PROCESSING METHOD

(71) Applicant: Samsung Display Co., LTD., Yongin-si (KR)

(72) Inventors: Akifumi Sangu, Hwaseong-si (KR); Hyoung Joo Kim, Anyang-si (KR); Jung Hwa You, Hwaseong-si (KR); Il Young Jeong, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 676 days.

(21) Appl. No.: 17/888,717

(22) Filed: Aug. 16, 2022

(65) Prior Publication Data
US 2023/0191533 A1    Jun. 22, 2023

(30) Foreign Application Priority Data
Dec. 16, 2021    (KR) .................. 10-2021-0180242

(51) Int. Cl.
*B23K 26/082*    (2014.01)
*B23K 26/06*    (2014.01)

(52) U.S. Cl.
CPC ........ *B23K 26/082* (2015.10); *B23K 26/0643* (2013.01); *B23K 26/0648* (2013.01)

(58) Field of Classification Search
CPC ............ B23K 26/0608; B23K 26/0622; B23K 26/064; B23K 26/352; B23K 26/354; H01L 21/0262; H01L 21/02678; H01L 21/02488; H01L 21/02532; H01L 21/02595; H01L 21/02686; H01L 21/268; H01L 21/77; H01L 21/67115; H10D 86/021

See application file for complete search history.

(56) References Cited

FOREIGN PATENT DOCUMENTS

| | | |
|---|---|---|
| JP | 3221338 | 5/2019 |
| JP | 3221341 | 5/2019 |
| KR | 10-1920685 | 2/2019 |
| KR | 10-2019-0060407 | 6/2019 |
| KR | 10-2021-0096849 | 8/2021 |
| KR | 10-2021-0133338 | 11/2021 |

*Primary Examiner* — Robert G Bachner
(74) *Attorney, Agent, or Firm* — Womble Bond Dickinson (US) LLP

(57) ABSTRACT

A laser processing apparatus includes a laser source; a width adjuster that adjusts a width of a laser beam irradiated from the laser source; and a scanner that adjusts an irradiation direction of the laser beam having passed through the width adjuster, wherein the width adjuster includes a first width adjusting portion and a second width adjusting portion arranged on a traveling direction of the laser beam, a focal length of the first width adjusting portion is equal to or greater that about 20,000 mm and a focal length of the second width adjusting portion is equal to or greater than about 20,000 mm.

20 Claims, 16 Drawing Sheets

LASER PROCESSING APPARATUS AND LASER PROCESSING METHOD

CROSS-REFERENCE TO RELATED APPLICATION(S)

This application claims priority to and benefits of Korean Patent Application No. 10-2021-0180242 under 35 U.S.C. § 119, filed on Dec. 16, 2021 in the Korean Intellectual Property Office (KIPO), the entire contents of which are incorporated herein by reference.

BACKGROUND

1. Technical Field

The disclosure relates to a laser processing apparatus and laser processing method.

2. Description of the Related Art

A laser processing apparatus is used to cut a material, form a pattern, perform welding, and so on, using a laser beam. The laser beam used during the laser processing has a strong directivity and a high density. Specifically, a high-power laser allows for precision processing without affecting the surroundings, and thus it can be used for processing a display panel.

A laser processing apparatus may include a laser source for outputting a laser beam, a laser irradiation unit including a scanner for controlling the irradiation position of the output laser beam and an F-theta lens for condensing the laser beam whose irradiation position has been determined, and a stage on which a subject to be processed is placed.

In a laser processing apparatus, a scanning line of a laser beam is determined by a scanner

SUMMARY

Embodiments of the disclosure may provide a laser processing apparatus that can improve the reliability by employing a simple structure that prevents the area where a laser beam is irradiated from varying along a processing path of the laser processing apparatus if the cross-section of the laser beam shown in FIG. an elliptical shape.

Embodiments of the disclosure may also provide a laser processing method that can prevent defects due to a difference between areas where laser beams are irradiated by way of adjusting a laser beam having an elliptical cross-section into a laser beam having a perfectly circular cross-section in a simple way.

It should be noted that objects of the disclosure are not limited to the above-mentioned object; and other objects of the disclosure will be apparent to those skilled in the art from the following descriptions.

According to an embodiment of the disclosure, a laser processing apparatus may comprise a laser source; a width adjuster that adjusts a width of a laser beam irradiated from the laser source; and a scanner that adjusts an irradiation direction of the laser beam having passed through the width adjuster, wherein the width adjuster may comprise a first width adjusting portion and a second width adjusting portion arranged on a traveling direction of the laser beam, a focal length of the first width adjusting portion is equal to or greater than about 20,000 mm, and a focal length of the second width adjusting portion may be equal to or greater than about 20,000 mm.

The first width adjusting portion and the second width adjusting portion may have a same shape and be made of a same material.

The laser processing apparatus may further comprise an F-theta lens that focuses the laser beam having passed through the scanner on a region to be processed.

Each of the first width adjusting portion and the second width adjusting portion may comprise a reference line, and the first width adjusting portion and the second width adjusting portion may adjust a cross section of an incident laser beam in a direction perpendicular to the reference line.

Each of the first width adjusting portion and the second width adjusting portion may comprise a convex surface and a concave surface, and the convex surface and the concave surface may have different curvatures.

The convex surface of the first width adjusting portion and the convex surface of the second width adjusting portion may be arranged in a direction in which the laser beam is incident on the width adjuster, and the laser beam may pass through the first width adjusting portion and the second width adjusting portion and may contact in a direction perpendicular to the reference line of the first width adjusting portion and the reference line of the second width adjusting portion.

A radius of curvature of the convex surface may be in a range of about 23 mm to about 24 mm, a radius of curvature of the concave surface may be in a range of about 19 mm to about 21 mm, and each of a thickness of the first width adjusting portion and a thickness of the second width adjusting portion may be in a range of about 9 mm to about 11 mm.

The width adjuster may comprise an opening, and an arrangement of the first width adjusting portion and the second width adjusting portion may be adjustable by the opening.

The laser beam may pass through the first width adjusting portion and the second width adjusting portion and may contact in a direction perpendicular to the reference line of the first width adjusting portion and the reference line of the second width adjusting portion, and the cross section of the laser beam incident on the width adjuster may be adjustable by adjusting the arrangement of the first width adjusting portion and an angle between the reference line of the first width adjusting portion and the reference line of the second width adjusting portion.

The laser processing apparatus may further comprise a beam expander disposed between the laser source and the width adjuster to increase an overall diameter of the laser beam.

A cross-sectional area of the laser beam exiting from the beam expander in a direction perpendicular to a traveling direction may be smaller than a cross-sectional area of each of the first width adjusting portion and the second width adjusting portion.

The first width adjusting portion and the second width adjusting portion may have different shapes.

Each of the first width adjusting portion and the second width adjusting portion may comprise a convex surface and a concave surface, and the convex surface and the concave surface may have different curvatures.

The convex surface of the first width adjusting portion may face a direction in which the laser beam is incident on the width adjusting portion, and the convex surface of the second width adjusting portion may face a direction in which the laser beam exits from the width adjuster.

Each of the first width adjusting portion and the second width adjusting portion may comprise a reference line, and the first width adjusting portion and the second width adjusting portion may adjust a cross section of an incident laser beam in a direction perpendicular to the reference line.

The first width adjusting portion may contract the cross section of the laser beam passing through the first width adjusting portion in a direction perpendicular to the reference line of the first width adjusting portion, and the second width adjusting portion may expand the cross section of the laser beam passing through the second width adjusting portion in a direction perpendicular to the reference line of the second width adjusting portion.

According to an embodiment of the disclosure, a laser processing method may comprise measuring a cross section of a laser beam; analyzing the cross section of the laser beam to determine a direction of a major axis, a direction of a minor axis, and a ratio of the major axis to the minor axis; and arranging a first width adjusting portion and a second width adjusting portion such that the first and second width adjust portions and a traveling direction of the laser beam by adjusting relative angles between a reference line of the first width adjusting portion and a reference line of the second width adjusting portion and the major axis and the minor axis of the laser beam based on the directions of the major and minor axes and the ratio.

The laser processing method may further comprise adjusting the cross section of the laser beam by irradiating the laser beam toward the first width adjusting portion and the second width adjusting portion after the arranging of the first width adjusting portion and the second width adjusting portion.

The laser processing method may further comprise processing a workpiece by using the laser beam after the adjusting of the cross section of the laser beam.

The laser processing method may further comprise disposing a scanner such that the scanner and the traveling direction of the laser beam intersect each other.

According to embodiments of the disclosure, a laser beam having an elliptical cross-section can be adjusted into a laser beam having a perfectly circular cross-section. Accordingly, it is possible to prevent that the area where the laser beam is irradiated varies depending on the processing paths of the laser processing apparatus.

It should be noted that effects of the disclosure are not limited to those described above and other effects of the disclosure will be apparent to those skilled in the art from the following descriptions.

BRIEF DESCRIPTION OF THE DRAWINGS

The above and other embodiments and features of the disclosure will become more apparent by describing in detail embodiments thereof with reference to the attached drawings, in which.

DETAILED DESCRIPTION OF THE EMBODIMENTS

Figure 1:
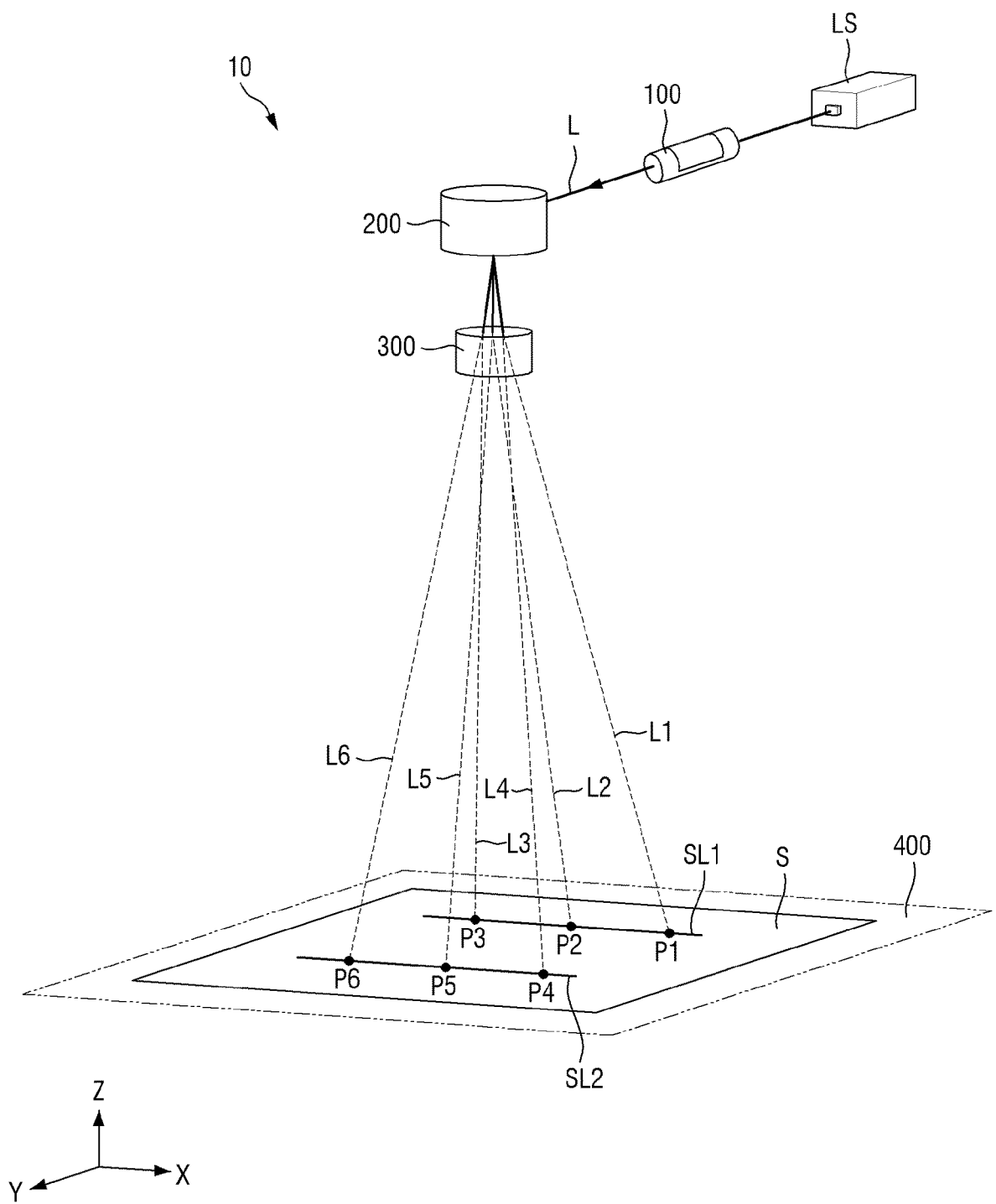
FIG. 1 is a schematic perspective view of a laser processing apparatus according to an embodiment of the disclosure.

The disclosure will now be described more fully hereinafter with reference to the accompanying drawings, in which embodiments of the disclosure are shown. This disclosure may, however, be embodied in different forms and should not be construed as limited to the embodiments set forth herein. Rather, these embodiments are provided so that this disclosure will be thorough and complete, and will convey the scope of the disclosure to those skilled in the art.

It will also be understood that in case that a layer is referred to as being "on" another layer or substrate, it can be directly on the other layer or substrate, or intervening layers may also be. The same reference numbers indicate the same components throughout the specification.

It will be understood that, although the terms "first," "second," and the like may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

It will be understood that the terms "contact," "connected to," and "coupled to" may include a physical and/or electrical contact, connection, or coupling.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

The phrase "at least one of" is intended to include the meaning of "at least one selected from the group of" for the purpose of its meaning and interpretation. For example, "at least one of A and B" may be understood to mean "A, B, or A and B."

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, embodiments of the disclosure will be described with reference to the accompanying drawings.

FIG. 1 is a schematic perspective view of a laser processing apparatus according to an embodiment of the disclosure.

Referring to FIG. 1, the laser processing apparatus 10 according to the embodiment of the disclosure may be used for processing a substrate S or the like using a laser. For example, the laser processing apparatus 10 may be used to cut the substrate S, heat the structure S or an element on the substrate S, or perform patterning.

The laser processing apparatus 10 may include a laser source LS for irradiating a laser beam L, a width adjuster 100 for adjusting the width of the cross section of the laser beam L, a scanner 200 for controlling the traveling direction of the laser beam L, an F-theta lens 300 for adjusting the focus of the laser beam L having passed through the scanner 200, and a stage 400 on which the substrate S is placed.

For convenience of illustration, a xyz coordinate system may be defined in FIG. 1.

As shown in FIG. 1, a substrate S to be subjected to laser processing may be placed on the stage 400. The surface of the stage 400 may be parallel to the xy plane. The stage 400 can move in directions orthogonal to each other on the xy plane. For example, the stage 400 may move in x-axis and y-axis that are orthogonal to each other.

The laser source LS, the width adjuster 100, the scanner 200 and the F-theta lens 300 may be disposed above the stage 400 (in the z-axis direction). For example, the F-theta lens 300 may be disposed above the stage 400 such that it is spaced apart from the stage 400 in the third direction (e.g., z-axis direction). The scanner 200 may be disposed above the F-theta lens 300 such that it is spaced apart from the F-theta lens 300 in the third direction (z-axis direction). The laser source LS and the width adjuster 100 may be located at the same height as the scanner 200 from the plane of the stage 400. For example, the scanner 200, the width adjuster 100 and the laser source LS may be spaced apart from one another other in the second direction (x-axis direction) on the same xy plane, and may be arranged in the order of the scanner 200, the width adjuster 100 and the laser source LS. It should be understood, however, that the disclosure is not limited thereto. For example, the width adjuster 100 may be disposed higher than the scanner 200 and the laser source LS may be disposed higher than the width adjuster 100 from the plane of the stage 400. Even in this instance, the scanner 200, the width adjuster 100 and the laser source LS may be arranged on a single straight line.

Any of laser generating devices well known in the art may be employed as the laser source LS. The laser source LS may irradiate the laser beam L. The laser source LS may irradiate the laser beam L continuously or discretely. The wavelength, amplitude, energy density, etc. of the laser beam L may be adjusted by the laser source LS. The wavelength of the laser beam L may be, but is not limited to, about 340 nm to about 360 nm. For example, the wavelength of the laser beam L may exceed about 360 nm. The irradiation time of the laser beam L may be shorter than 1 nanosecond. For example, the irradiation time of the laser beam L may be, but is not limited to, tens of pico seconds or tens of femto seconds. The irradiation time of the laser beam L may be sufficient long, from several tens of seconds to several minutes.

The laser source LS may irradiate a single beam or multi-beams. In this embodiment, the laser source LS may irradiate a single beam.

The laser beam L irradiated from the laser source LS may be analyzed using a separate beam profiler (not shown). Specifically, the cross section of the laser beam L irradiated from the laser source LS may be measured, and it may be determined whether the cross section is either a perfect circle or an ellipse. If the cross section of the laser beam L is an ellipse, the directions of the major axis and the minor axis of the ellipse, the ratio between the length of the major axis and the length of the minor axis, etc. may be measured.

The single laser beam L may travel straight to reach the width adjuster 100. The width adjuster 100 may be disposed in the traveling direction of the laser beam L on the same plane as the laser source LS. Accordingly, the laser beam L irradiated from the laser source LS may pass through the width adjuster 100. Specifically, the laser beam L may be incident on an incidence portion of the width adjuster 100, may pass through a barrel, and may exit through an exit portion of the width adjuster 100. The width adjuster 100 may adjust the width of the cross-section of the laser beam L. Specifically, the width adjuster 100 may adjust the vertical and/or horizontal width of the cross section of the laser beam L, so that the laser beam L having an elliptical cross-section can be converted into the laser beam L having a perfectly circular cross-section. The width adjuster 100 will be described in detail later with reference to FIGS. 2 to 7.

The laser beam L exiting from the width adjuster 100 may reach the scanner 200. The scanner 200 may be disposed in the traveling direction of the laser beam L on the same plane as the laser source LS and the width adjuster 100. Accordingly, the laser beam L exiting from the width adjuster 100 may pass through the scanner 200. The scanner 200 may change the traveling direction of the incident laser beam L toward the stage 400 and may divide a single laser beam L into laser beams L. The exit angle of the laser beam L and the number of the exiting beams may be controlled by the scanner 200. In order to control the exit angle of the laser beam L and the number of exiting beams, the scanner 200 may include one or more galvanometer mirrors 211 and 212 (see FIG. 8). The scanner 200 will be described in detail later with reference to FIGS. 8 to 11.

The laser beam L exiting from the scanner 200 may reach the F-theta lens 300. The F-theta lens 300 may be spaced apart from the scanner 200 and disposed between the scanner 200 and the stage 400. Accordingly, the laser beam L exiting from the scanner 200 may pass through the F-theta lens 300.

Any of a variety of F-theta lenses 300 made up of a single lens or lenses may be employed as the F-theta lens 300. The F-theta lens 300 may adjust the focal distances of laser beams L so that they focus on an area of the substrate S that is to be processed.

The laser beam L passing through the F-theta lens 300 may reach the substrate S disposed on the stage 400. The laser beam L may be used for various purposes, such as cutting the substrate S or forming contact holes during the process of fabricating the display of a display device.

Figure 2:
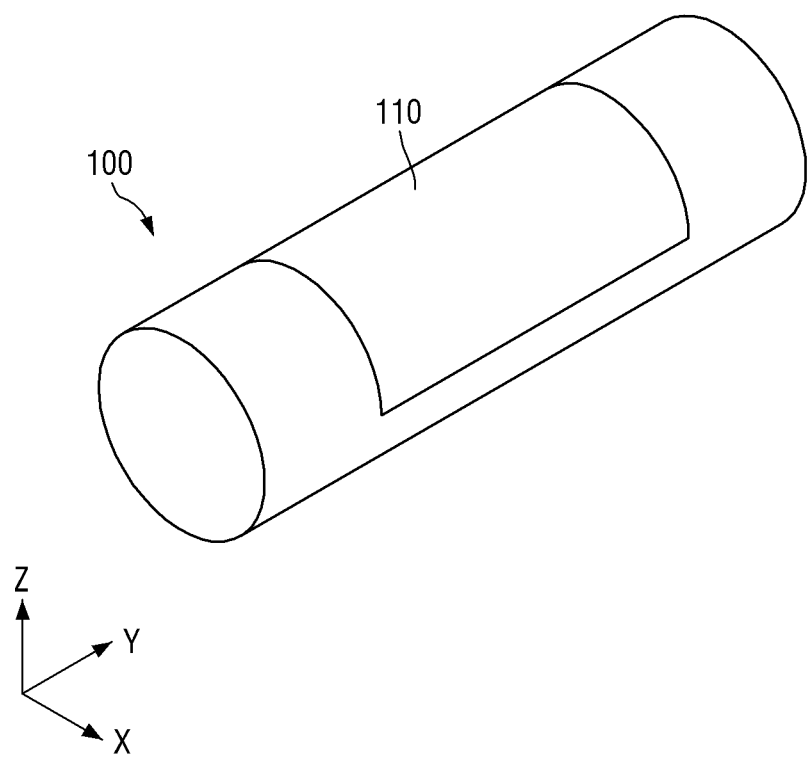
FIG. 2 is a schematic side view showing the width adjuster in case that the cover is closed.
Figure 3:
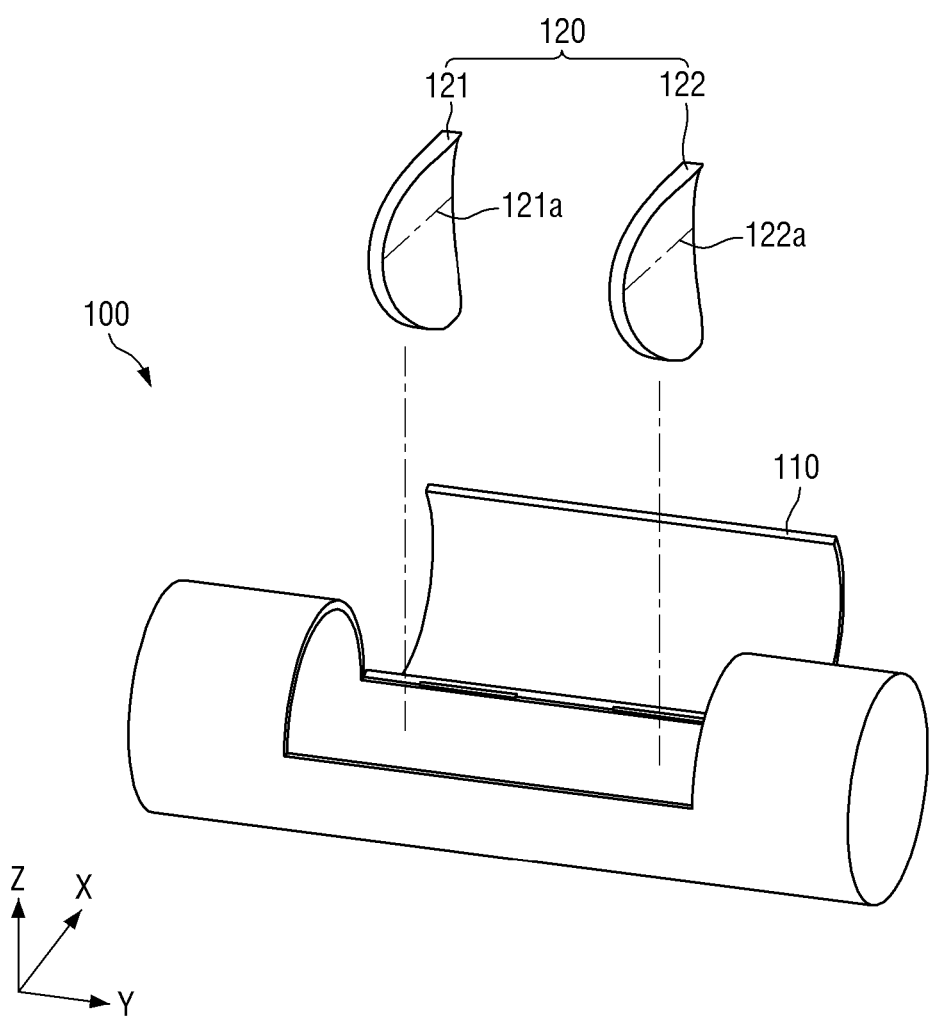
FIG. 3 is a schematic side view showing the width adjuster in case that the cover is opened.
Figure 4:
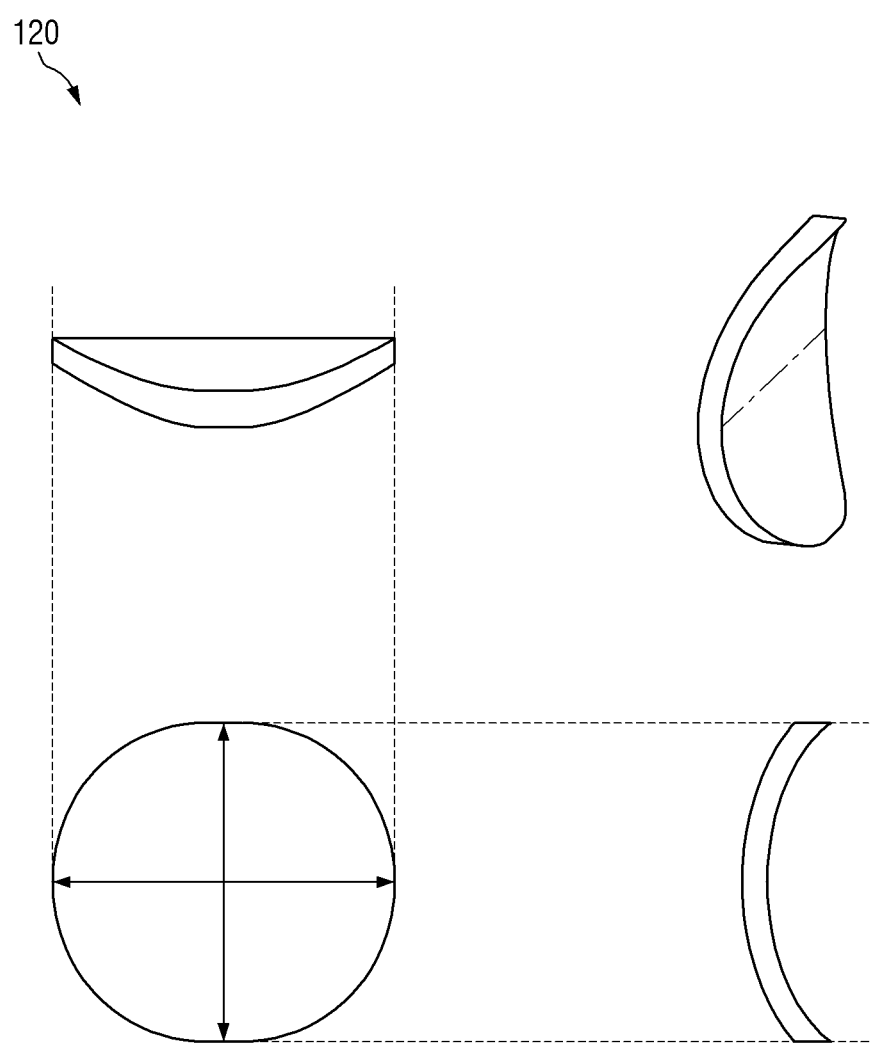
FIG. 4 is a schematic view showing a shape of a width adjusting portion.

FIG. 2 is a schematic side view showing the width adjuster in case that the cover is closed. FIG. 3 is a schematic side view showing the width adjuster in case that the cover is opened. FIG. 4 is a schematic view showing a shape of a width adjusting portion.

Referring to FIGS. 2 and 3, the width adjuster 100 may include a barrel and a pair of width adjusting portions 120. The barrel may have a hollow column shape. Although the barrel may have a cylindrical shape in the drawings, the disclosure is not limited thereto. For example, the barrel may have any of a variety of hollow shapes, such as a rectangular column and a triangular column. In the following description, it may be assumed that the barrel has a cylindrical shape. The pair of width adjusting portions 120 may have the same shape and may be made of the same material. The barrel may include an opening 110. The top of the barrel may be opened by the opening 110. The width adjusting portions 120 may be disposed inside the barrel by opening the opening 110, and the location of the width adjusting portions 120 may be adjusted inside the barrel by closing the opening 110. The barrel may include a fixing portion (not shown) on the inner surface. The width adjusting portions 120 may be fixed using the fixing portion.

The width adjusting portions 120 may be disposed inside the barrel. Two width adjusting portions 120 may be disposed as a pair. The width adjusting portions 120 disposed on the left side may be defined as a first width adjusting portion 121, and the width adjusting portions 120 disposed on the right side may be defined as a second width adjusting portion 122. Reference lines 121a and 122a may be drawn to describe the arrangement and relative angle of the width adjusting portions 120. Each of the width adjusting portions 120 may have a curved elliptical shape. The pair of width adjusting portions 120 may be made of the same material, may have the same shape, and may have a constant refractive index. Each of the width adjusting portions 120 may have a convex surface and a concave surface. Each of the width adjusting portions 120 may have a focus at infinity and may include the convex surface and the concave surface of different curvatures. Herein, a lens having a focus at infinity may mean that the focal length of the lens is very far, so that it can be regarded that the lens has no power. The focal length of the width adjusting portions may be about 20,000 mm or more. Considering the size of the laser processing apparatus 10 and the size of a workpiece, if the focal length of the width adjusting portions 120 used in the laser processing apparatus 10 is about 20,000 mm or more, it can be regarded that the focal length is substantially at infinity. Therefore, in case that the focal length of the width adjusting portions 120 is about 20,000 mm or more, it can be said that there is substantially no power. The light incident parallel to the width adjusting portions 120 may pass through the width adjusting portions 120 and may be refracted twice, once on the incidence surface and once on the exit surface. By disposing the pair of width adjusting portions 120, the laser beam L incident on the width adjuster 100 in parallel may exit in parallel after the total of four refractions. As such, by disposing the width adjusting portions 120 having a substantially infinite focal length in the laser processing apparatus 10 so that the paths of the laser beam L incident on the width adjusting portions 120 and the laser beam L exiting are parallel, it is possible to prevent an aberration problem such as Petzval field curvature in case that the laser beam L exiting from the width adjusting portions 120 may pass through the F-theta lens 300. As a result, it may be effective for correcting the roundness of the laser beam L.

Referring to FIG. 4, each of the width adjusting portions 120 may have a curved elliptical shape.

The width adjusting portions 120 may have an elliptical shape having the major axis and the minor axis, with the ends of the major axis bent toward each other. Specifically, each of the width adjusting portions 120 may have a convex surface and a concave surface, the convex surface and the concave surface are bent in the same direction, and the curvature radius of the convex surface may be different from that of the concave surface. For example, the radius of curvature of the convex surface may be in a range of about 23 mm to about 24 mm, and the radius of curvature of the concave surface may be in a range of about 19 mm to about 21 mm. In case that the radius of curvature of the convex surface is set to about 23.348 mm, the radius of curvature of the concave surface is set to about 20 mm, and the thickness is set to about 10 mm, the effective focal length (EFL) of the width adjusting portions 120 is about 38,040 mm, which can approach substantially infinity. It should be understood, however, that the radius of curvature of each of the concave and convex surfaces may be not limited thereto. For example, the radius of curvature of the concave surface and the radius of curvature of the convex surface may have different values as long as the width adjusting portions 120 have a focus at infinity, i.e., an infinite focal length.

In the schematic cross-sectional view, the width adjusting portions 120 may have a column shape curved in one direction. A part of the upper portion of the concave surface and a part of the lower portion of the concave surface may face each due to the curvature of the width adjusting portions 120, but the disclosure is not limited thereto. For example, in case that the curvature of the concave surface is large enough, a part of the upper portion of the concave surface and a part of the lower portion of the concave surface may face each other, but in case that the curvature of the concave surface is small, the upper portion and the lower portion of the concave surface may not face each other.

The side surfaces of the width adjusting portions 120 may be flat and may be parallel to each other. By making the side surface of the width adjusting portions 120 flat and parallel to each other, it is possible to reduce the impact of external shocks in case that the width adjusting portions 120 may be placed inside the barrel. In case that the width adjusting portions 120 may be rotated and disposed, the space occupied by the width adjusting portions 120 may be the same, so it can be easily placed inside the barrel. It should be understood, however, that the disclosure is not limited thereto. For example, the side surface of the width adjusting portions 120 may not be parallel to each other, and an additional fixing portion having an adjustable width may be provided in the space inside the barrel where the width adjusting portions 120 are disposed.

When viewed from the top (or in a plan view), each of the width adjusting portions 120 may be a perfect circle in which the vertical length is equal to the horizontal length. As the width adjusting portions 120 have a perfect circuit when viewed from the top (or in a plan view), the width adjusting portions 120 may occupy the same space inside the barrel even in case that the width adjusting portions 120 are rotated. Accordingly, the width adjusting portions 120 can be rotated and disposed inside the barrel without changing the space inside the barrel.

Although the shape of the width adjusting portions 120 may be a circle when viewed from the top (or in a plan view) in the foregoing description, the shape of the width adjusting portions 120 may be not limited thereto. For example, the width adjusting portions 120 may have a square or rectangular shape or may have a triangular shape when viewed from the top (or in a plan view). Even in this instance, the width adjusting portions 120 may have a curved column shape in schematic cross-sectional view and may have a concave surface and a convex surface. In the following description, it may be assumed that the width adjusting portions 120 have a circular shape when viewed from the top (or in a plan view) for convenience of illustration.

The width adjusting portions 120 may be made of any of various optical glasses well known in the art as long as it can form a lens. For example, the glasses may include plate glass, cast glass, PYREX glass, DURAN glass, ZERODUR glass, and the like, or a combination thereof. The width adjusting portions 120 may image a material that is transparent and has a refractive index different from that of air. Accordingly, the incident laser may be refracted twice, once on the convex surface and once on the concave surface, and may pass through the width adjusting portions 120.

The opening 110 of the barrel may be opened so that the arrangement of the first width adjusting portion 121 and the angle between the first width adjusting portion 121 and the second width adjusting portion 122 may be adjusted according to the cross-sectional shape of the laser beam L irradiated from the laser source LS. By doing so, it is possible to adjust a laser beam L having an elliptical cross-section at different ratios into a laser beam L having a perfectly circular cross-section.

Figure 5:
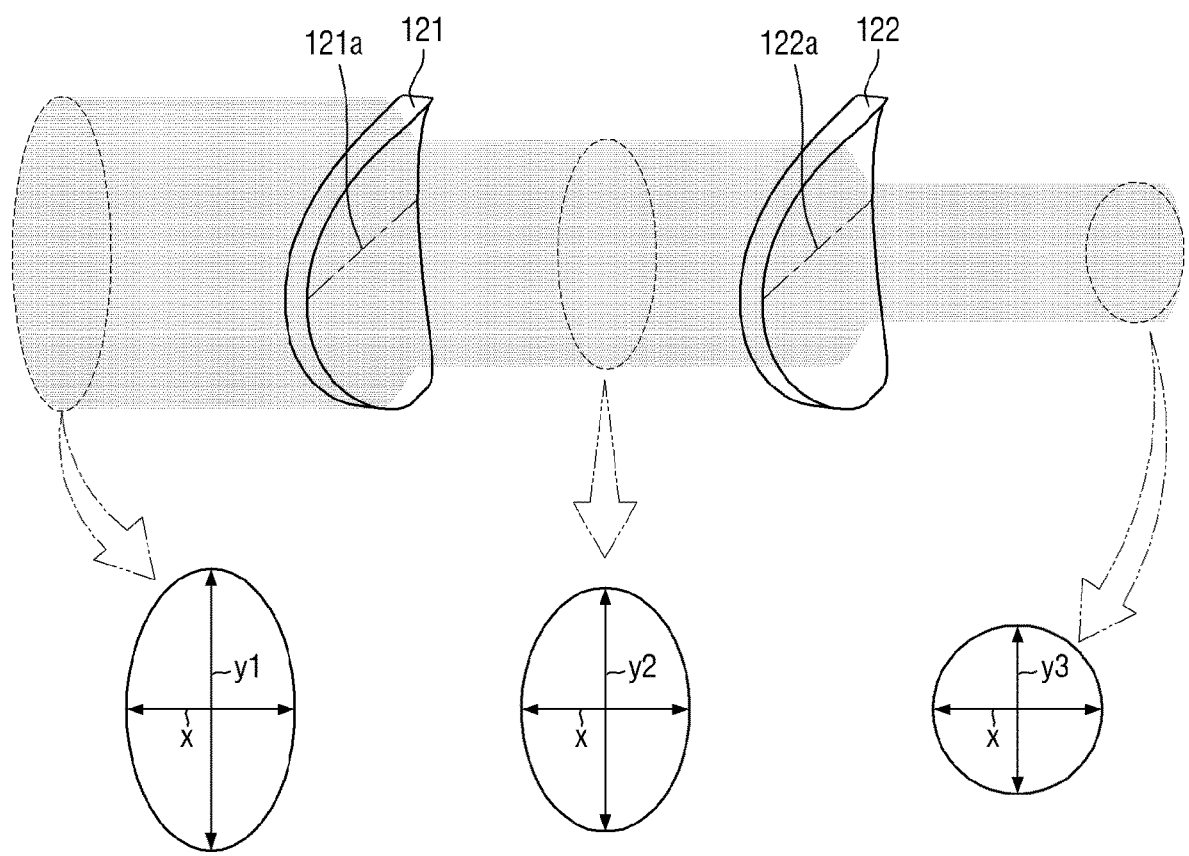
FIGS. 5 to 7 are schematic views showing the shapes of a laser beam according to the arrangement of the width adjusting portions inside the barrel.
Figure 6:
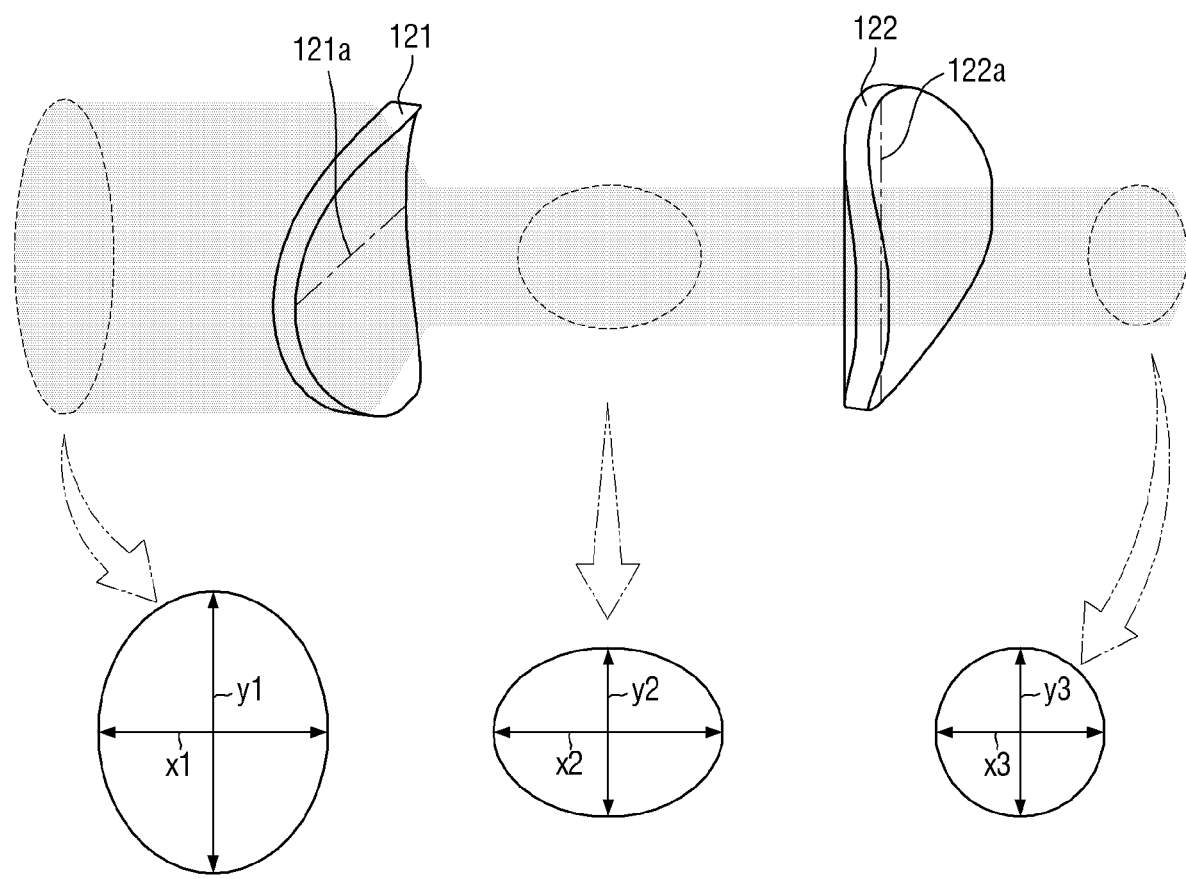
Figure 7:
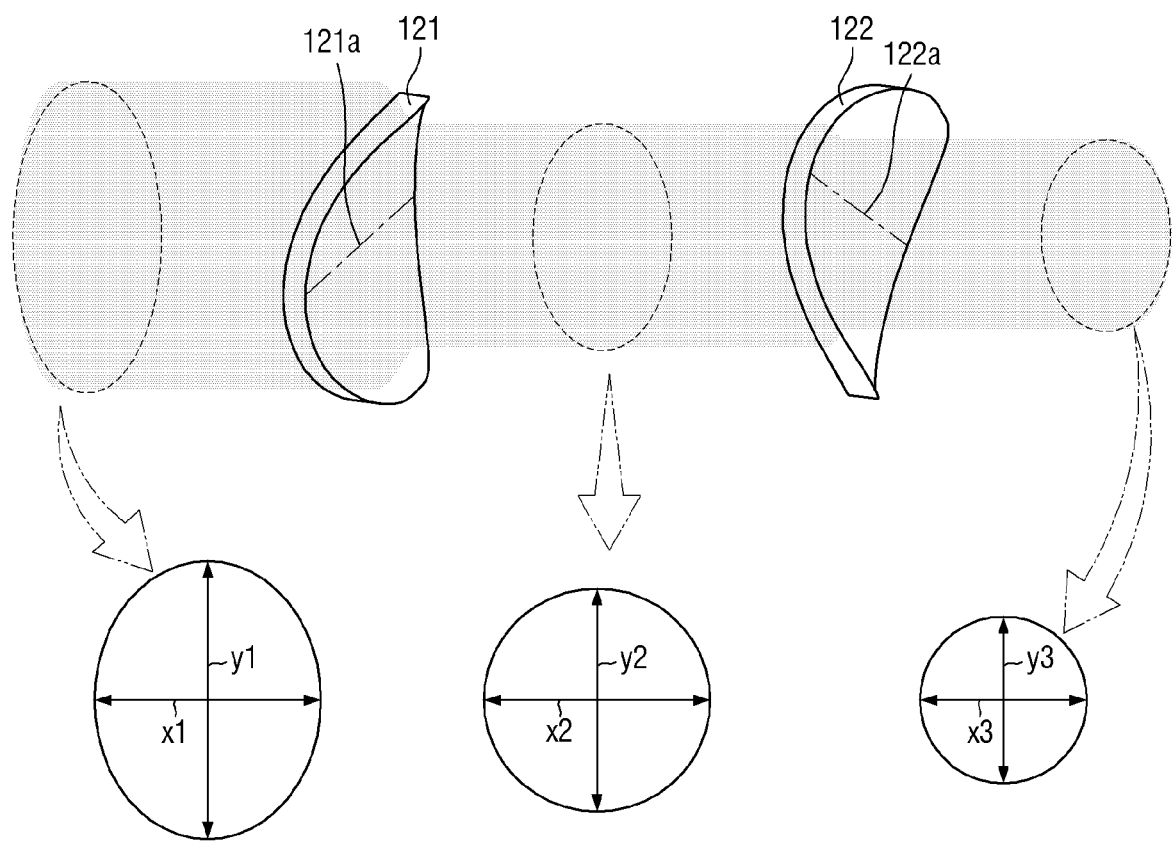

FIGS. 5 to 7 are views showing the shapes of a laser beam according to the arrangement of the width adjusting portions inside the barrel.

Referring to FIG. 5, the first width adjusting portion 121 and the second width adjusting portion 122 may be arranged in the barrel such that the reference lines 121a and 122a are parallel to each other. The laser beam L incident on the barrel may pass through the first width adjusting portion 121 and may be refracted, may contact in the vertical direction perpendicular to the reference line 121a, and may exit in the same direction as the incidence direction. Since the first width adjusting portion 121 may have a focus at infinity, the laser incident on the first width adjusting portion 121 and the exiting laser may be parallel to each other. The laser beam L exiting from the first width adjusting portion 121 may pass through the second width adjusting portion 122 and refracted, may contract once again in the vertical direction perpendicular to the reference line 122a. Since the second width adjusting portion 122 also has a focus at infinity like first width adjusting portion 121, the laser incident on the second width adjusting portion 122 and the exiting laser may be parallel to each other. As such, the laser beam L incident on the width adjuster 100 may contract twice in the vertical direction and may exit parallel to the incidence direction. Therefore, a laser beam L having an elliptical cross-section with the major axis in the vertical direction and the minor axis in the horizontal direction may pass through the pair of the width adjusting portions 120, such that the major axis contacts while the minor axis remains. As a result, the laser beam L may have a perfectly circular cross-section.

For detailed description, a schematic cross-sectional view of the laser beam L incident on the barrel, a schematic cross-sectional view of the laser beam L after passing through the first width adjusting portion 121, and a schematic cross-sectional view of the laser beam L after passing through the second width adjusting portion 122 will be compared with one another. The length of the horizontal axis may have the same value, i.e., x at the three points. The length of the vertical axis of the laser beam L incident on the barrel may have the greatest value, i.e., y1. The length of the vertical axis of the laser beam L after passing through the first width adjusting portion 121 may have a value smaller than y1, i.e., y2. The length of the vertical axis of the laser beam L after passing through the second width adjusting portion 122 may have a value smaller than y2, i.e., y3. If the value y3 becomes equal to the value x, the length of the vertical axis is equal to the length of the horizontal axis of the laser beam L, and thus the laser beam L having an elliptical cross-section can be adjusted into the laser beam L having a perfectly circular cross-section.

In particular, with such arrangement, in case that the radius of curvature of the convex surface of the width adjusting portions 120 is about 23.348 mm, the radius of curvature of the concave surface is about 20 mm and the thickness is about 10 mm, it may be possible to adjust a laser beam L having an elliptical cross-section with a ratio of the major axis to the minor axis of 1.5 to 1 into a laser beam L having a perfectly circular cross-section.

Referring to FIG. 6, the first width adjusting portion 121 and the second width adjusting portion 122 may be arranged in the barrel such that the reference lines 121a and 122a are perpendicular to each other. The laser beam L incident on the barrel may pass through the first width adjusting portion 121 and may be refracted, may contact in the vertical direction perpendicular to the reference line 121a, and may exit in the same direction as the incidence direction. Since the first width adjusting portion 121 may have a focus at infinity, the laser incident on the first width adjusting portion 121 and the exiting laser may be parallel to each other. The laser beam L exiting from the first width adjusting portion 121 may pass through the second width adjusting portion 122 and refracted, may contract once again in the horizontal direction perpendicular to the reference line 122a. Since the second width adjusting portion 122 also has a focus at infinity like first width adjusting portion 121, the laser incident on the second width adjusting portion 122 and the exiting laser may be parallel to each other. As such, the laser beam L incident on the width adjuster 100 may contract once in the vertical direction and once in the horizontal direction, and may exit parallel to the incidence direction. Accordingly, the laser beam L having the shape of the perfect circle is incident on and passes through the pair of width adjusting portions 120 such that it contracts in both the vertical and horizontal directions, so that the laser beam L can be adjusted to have the shape of a perfect circle with reduced cross section.

For detailed description, a schematic cross-sectional view of the laser beam L incident on the barrel, a schematic cross-sectional view of the laser beam L after passing through the first width adjusting portion 121, and a schematic cross-sectional view of the laser beam L after passing through the second width adjusting portion 122 will be compared with one another. The length of the horizontal axis of the laser beam L incident on the barrel, i.e., x1 may be equal to the length of the horizontal axis of the laser beam L after passing through the first width adjusting portion 121, i.e., x2. The length of the horizontal axis of the laser beam L after passing through the second width adjusting portion 122, i.e., x3 may be smaller than the values x1 and x2. The length of the vertical axis of the laser beam L incident on the barrel may have the greatest value, i.e., y1. The length of the vertical axis of the laser beam L after passing through the first width adjusting portion 121, i.e., y2 may be equal to the length of the vertical axis of the laser beam L after passing through the second width adjusting portion 122, i.e., y3.

Referring to FIG. 7, the first width adjusting portion 121 and the second width adjusting portion 122 may be arranged in the barrel such that the reference lines 121a and 122a have the angle of 45 degrees. The laser beam L incident on the barrel may pass through the first width adjusting portion 121 and may be refracted, may contact in the vertical direction perpendicular to the reference line 121a, and may exit in the same direction as the incidence direction. Since the first width adjusting portion 121 may have a focus at infinity, the laser incident on the first width adjusting portion 121 and the exiting laser may be parallel to each other. The laser beam L exiting from the first width adjusting portion 121 may pass through the second width adjusting portion 122 and refracted, may contract in the vertical and horizontal directions perpendicular to the reference line 122a, exiting in the same direction as the incidence direction. Since the second width adjusting portion 122 also has a focus at infinity like first width adjusting portion 121, the laser incident on the second width adjusting portion 122 and the exiting laser may be parallel to each other. As such, the laser beam L incident on the width adjuster 100 may contract once in the vertical direction and one in the vertical and horizontal directions, and may exit parallel to the incidence direction. Accordingly, the laser beam L has an elliptical cross-section with the major axis in the vertical direction and the minor axis in the horizontal direction is incident on and pass through the first width adjusting portion 121, such that the laser beam L may have a perfectly circular cross-section. It passes through the second width adjusting portion 122 such that it may be adjusted into a laser beam L having a perfectly circular cross-section with reduced cross section.

For detailed description, a schematic cross-sectional view of the laser beam L incident on the barrel, a schematic cross-sectional view of the laser beam L after passing through the first width adjusting portion 121, and a schematic cross-sectional view of the laser beam L after passing through the second width adjusting portion 122 will be compared with one another. The length of the horizontal axis of the laser beam L incident on the barrel, i.e., x1 may be equal to the length of the horizontal axis of the laser beam L after passing through the first width adjusting portion 121, i.e., x2. The length of the horizontal axis of the laser beam L after passing through the second width adjusting portion 122, i.e., x3 may be smaller than the values x1 and x2. The length of the vertical axis of the laser beam L incident on the barrel may have the greatest value, i.e., y1. The length of the vertical axis of the laser beam L after passing through the first width adjusting portion 121, i.e., y2 may be smaller than y1. The length of the vertical axis of the laser beam L after passing through the second width adjusting portion 122, i.e., y3 may be smaller than y2.

In this instance, since the amount of change in the length in the direction perpendicular to the reference lines 121a and 122a is greater than the amount of change in the length in the direction forming the angle of about 45 degrees with the reference lines 121a and 122a, the value of y2/y1 may be smaller than the value of y3/y2.

In each of the examples described above, the first width adjusting portion 121 may have the same arrangement and the arrangement of the second width adjusting portion 122 may be adjusted to form various angles between the first width adjusting portion 121 and the second width adjusting portion 122. It should be understood, however, that the disclosure is not limited thereto. For example, the second width adjusting portion 122 may be fixed and the angle between the first width adjusting portion 121 and the second width adjusting portion 122 may be adjusted by adjusting the arrangement of the first width adjusting portion 121. As another example, the arrangement of the first width adjusting portion 121 and the arrangement of the second width adjusting portion 122 may be adjusted together.

As described above, the arrangement of the width adjusting portions 120 included in the width adjuster 100 may be adjusted according to the cross-sectional shape of the laser beam L irradiated by the laser source LS analyzed using a separate beam profiler (not shown), so that the cross section of the laser beam L can be adjusted. Specifically, in case that the cross-section of the laser beam L irradiated from the laser source LS is a perfect circle, the reference lines 121a and 122a of the first width adjusting portion 121 and the second width adjusting portion 122 may be arranged in a direction perpendicular to each other in order to maintain the cross section of the laser beam L exiting from the width adjuster 100 as a perfect circle. In this manner, the direction in which the first width adjusting portion 121 contracts the laser beam L and the direction in which the second width adjusting portion 122 contracts the laser beam L may be perpendicular to each other. As a result, the cross section of the laser beam L that has passed through the width adjuster 100 can also be made into a perfect circle.

In case that the cross-section of the laser beam L is an ellipse in which the ratio of the major axis to the minor axis is equal to or greater than about 1.5:1, the first width adjusting portion 121 and the second width adjusting portion 122 may be arranged such that the reference lines 121a and 122a of the first width adjusting portion 121 and the second width adjusting portion 122 are perpendicular to the major axis of the cross section of the laser beam L, thereby reducing the difference in length between the major axis and the minor axis of the laser beam L.

In case that the cross section of the laser beam L has a ratio of the major axis to the minor axis between about 1:1 and about 1.5:1, by adjusting the angle between the reference lines 121a and 122a of the first width adjusting portion 121 and the second width adjusting 122 between about 0° and about 90°, the cross section of the laser beam L can be made into a perfect circle. For example, the first width adjusting portion 121 is arranged so that the reference line 121a of the first width adjusting portion 121 is perpendicular to the major axis of the laser beam L, and the second width adjusting portion 122 is arranged so that the reference line 122a of the second width adjusting portion 122 has the angle of about 45° with the reference line 121a of the first width adjusting portion 121, the difference in length between the major axis and the minor axis of the cross section of the laser beam L can be reduce.

Figure 8:
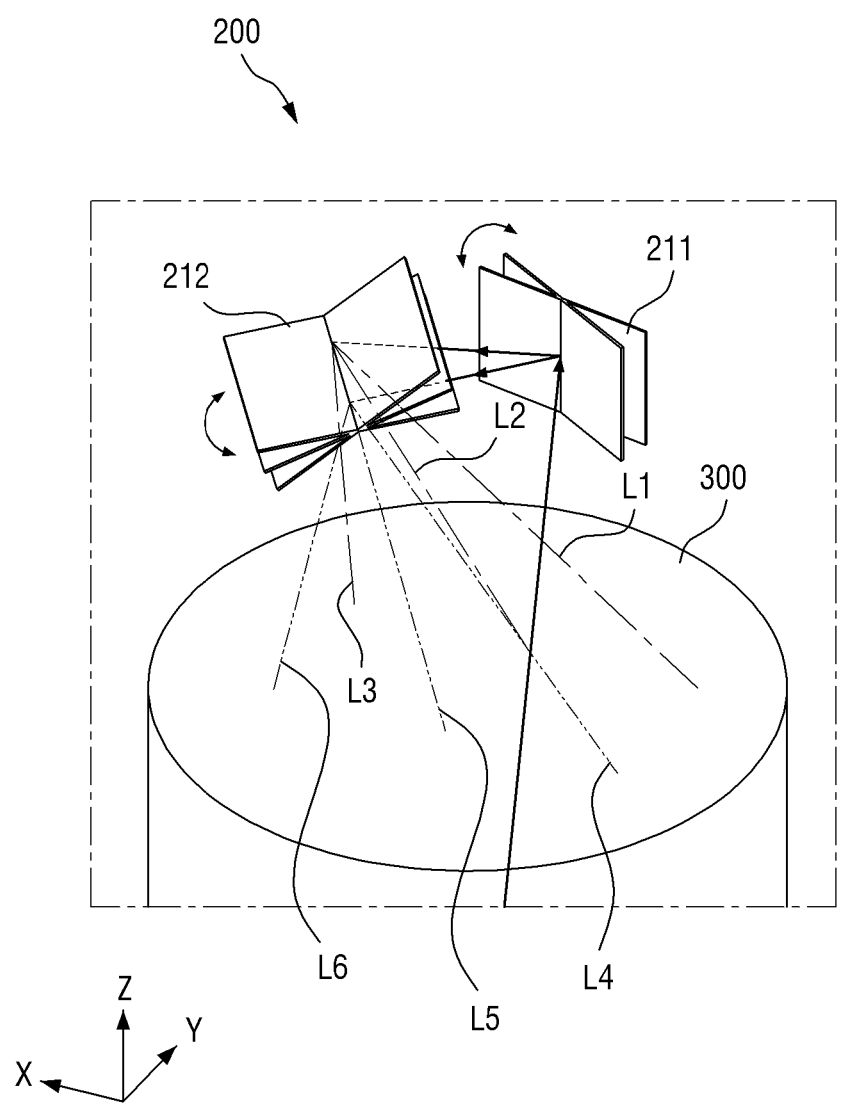
FIG. 8 is a schematic perspective view illustrating paths of laser beams reflected by a first galvano mirror and a second galvano mirror according to an embodiment of the disclosure.
Figure 9:
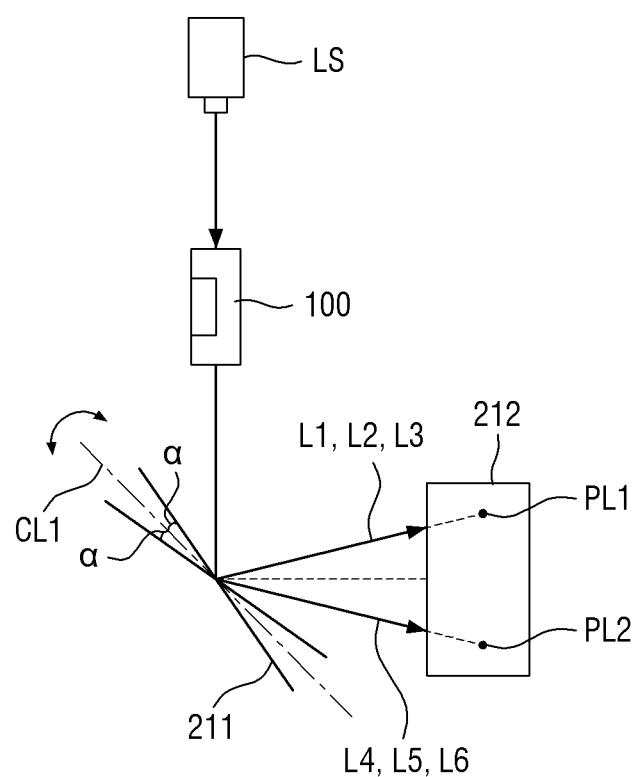
FIG. 9 is a schematic plan view illustrating paths of laser beams depending on the inclination angle of a first galvano mirror according to an embodiment of the disclosure.
Figure 10:
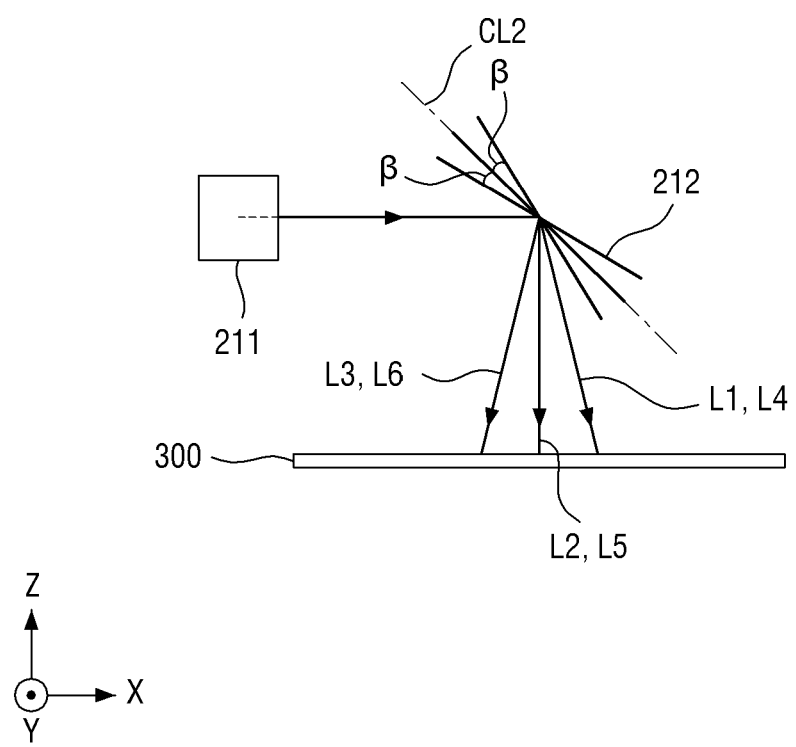
FIG. 10 is a schematic front view illustrating paths of laser beams depending on the inclination angle of a second galvano mirror according to the embodiment of the disclosure.

FIG. 8 is a schematic perspective view illustrating paths of laser beams reflected by a first galvano mirror and a second galvano mirror according to an embodiment of the disclosure. FIG. 9 is a schematic plan view illustrating paths of laser beams depending on the inclination angle of a first galvano mirror according to an embodiment of the disclosure. FIG. 10 is a schematic front view illustrating paths of laser beams depending on the inclination angle of a second galvano mirror according to the embodiment of the disclosure.

Referring to FIGS. 8 to 10, the scanner may include a first galvanometer mirror 211 and a second galvanometer mirror 212. The first galvanometer mirror 211 and the second galvanometer mirror 212 may be made of various materials that can reflect the incident laser beam or light. The first galvanometer mirror 211 may adjust a relative angle between the laser source LS and the width adjuster 100. The second galvanometer mirror 212 may adjust a relative angle with the first galvanometer mirror 211.

The first galvano mirror 211 may adjust the inclination angle on the xy plane to adjust the paths of the laser beams L in the first direction (e.g., y-axis direction).

The second galvano mirror 212 may adjust the inclination angle on the xy plane to adjust the paths of the laser beams L in the second direction (e.g., x-axis direction). Herein, the second direction (x-axis direction) may refer to a direction that is not parallel to the first direction (y-axis direction).

The first galvanometer mirror 211 and the second galvanometer mirror 212 may be positioned at the same height as the laser source LS from the plane of the stage 400. However, this is merely illustrative. The second galvanometer mirror 212 may be positioned between the first galvanometer mirror 211 and the stage 400.

The first galvanometer mirror 211 may be located on the path of the laser beam L that is irradiated from the laser source LS and travels straight.

The second galvano mirror 212 may be disposed on the path of the laser beam L that is reflected off the first galvano mirror 211 to travel.

Hereinafter, the traveling path of the laser beam L depending on the inclination angle of the first galvano mirror 211 will be described in detail below with reference to FIG. 9.

The reflecting surface of the first galvanometer mirror 211 may be disposed such that it faces the laser source LS and the width adjuster 100. The laser beam L irradiated from the laser source LS may pass through the width adjuster 100 to be incident on the reflecting surface of the first galvanometer mirror 211. The laser beam L traveling straight in one direction may be reflected by the first galvano mirror 211 such that it travels in another direction that is not parallel to the one direction. For example, in case that the laser beam L travels in the first direction (y-axis direction) as shown in FIG. 9, the laser beam L reflected by the first galvano mirror 211 may travel in a direction close to the second direction (x-axis direction) to reach the second galvano mirror 212 located nearby.

The first galvano mirror 211 may rotate so as to have discrete inclinations (rotation angles) on the xy plane. For example, the first galvano mirror 211 may rotate so as to have a first inclination and a second inclination different from the first inclination on the xy plane. Let us define an imaginary straight line having the average inclination of the first inclination and the second inclination as a first auxiliary line CL1. The first inclination may have the angle of a measured counterclockwise while the second inclination has the angle of a measured clockwise from the first auxiliary line CL1. The angle between the first inclination and the second inclination may be equal to 2α.

The incidence angle of the laser beam L incident on the first galvano mirror 211 may vary depending on the inclination of the first galvano mirror 111. For example, let us assume that the laser beam L has the incidence angle of about 45° with respect to the first auxiliary line CL1. The incidence angle may be about 45°+α in case that the first galvano mirror 211 has the first inclination, while the incidence angle may be about 45°−α in case that the first galvano mirror 211 has the second inclination.

According to the law of reflection, the laser beam L has the reflection angle of about 45°+α in case that the first galvano mirror 211 has the first inclination, the laser beam L has the reflection angle of about 45°−α in case that the first galvano mirror 111 has the second inclination.

A point at which the laser beam L reflected by the first galvanometer mirror 211 having the first inclination meets the second galvanometer mirror 212 may be referred to as PL1, and a point at which the laser beam L reflected by the first galvanometer mirror 211 having the second inclination meets the second galvanometer mirror 212 may be referred to as PL2. The points PL1 and PL2 may be spaced from each other in the first direction (y-axis direction) on the xy plane.

Since the incidence angle and the reflection angle of the laser beam L vary depending on the inclination of the first galvano mirror 211, even in case that the laser beam L is incident on the same point of the first galvano mirror 211, the laser beam L may be incident on different points of the second galvano mirror 212.

Hereinafter, the traveling path of the laser beam L depending on the inclination angle of the second galvano mirror 212 will be described in detail below with reference to FIG. 10.

The reflecting surface of the second galvanometer mirror 212 may be disposed such that it faces the first galvanometer mirror 211. The laser beam L reflected off the first galvanometer mirror 211 may be incident on the reflecting surface of the second galvanometer mirror 212. The laser beam L traveling straight in one direction may be reflected by the second galvanometer mirror 212 toward the F-theta lens 300. FIG. 10 illustrates an example where the laser beam L traveling straight in the second direction (x-axis direction) may be reflected toward the F-theta lens 300.

The second galvano mirror 212 may rotate so as to have continuous inclinations (rotation angles) on the xz plane. The second galvano mirror 212 may rotate continuously between a third inclination and a fourth inclination different from the third inclination on the xz plane. Let us define an imaginary straight line having an average inclination of the third inclination and the fourth inclination as a second auxiliary line CL2. The third inclination may have the angle of β measured counterclockwise while the fourth inclination may have the angle of β measured clockwise with respect to the second auxiliary line CL2. Accordingly, the angle between the third inclination and the fourth inclination may become 2β.

The incidence angle of the laser beam L incident on the second galvano mirror 212 may vary depending on the inclination of the second galvano mirror 212. For example, let us assume that the laser beam L has the incidence angle of about 45° with respect to the second auxiliary line CL2. The incidence angle may be about 45°+β in case that the second galvano mirror 212 has the third inclination. The incidence angle may be about 45° in case that the second galvano mirror 212 has the same inclination with the second auxiliary line CL2. The incidence angle may be about 45°−β in case that the second galvano mirror 212 has the fourth inclination.

The reflection angle may vary depending on the inclination of the second galvano mirror 212. According to the law of reflection, in case that the incidence angle changes, the reflection angle may change as much as the incidence angle.

Figure 11:
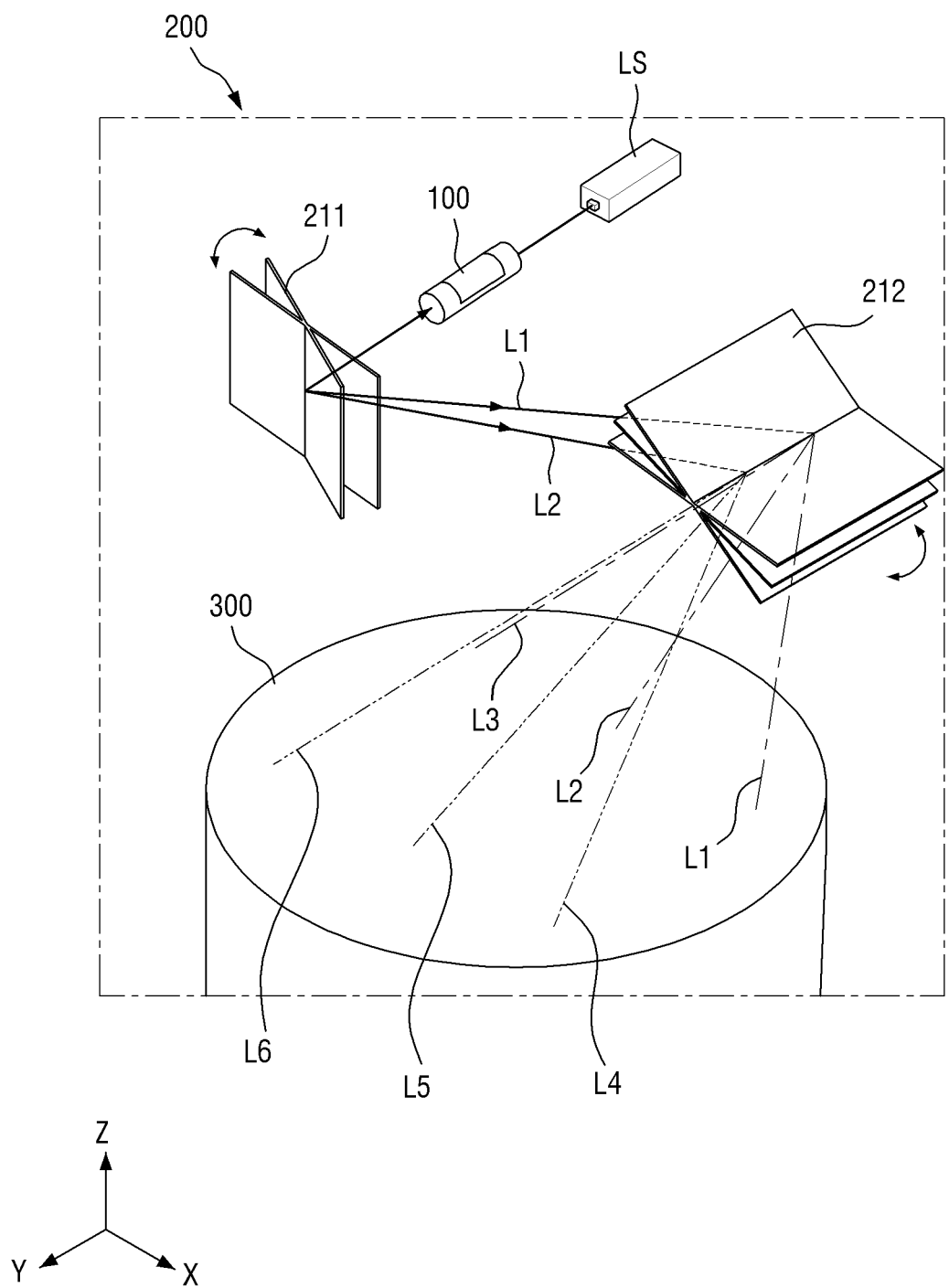
FIG. 11 is a schematic perspective view illustrating paths of laser beams reflected by a first galvanometer mirror and a second galvanometer mirror according to an embodiment of the disclosure.

FIG. 11 is a schematic perspective view illustrating paths of laser beams reflected by a first galvanometer mirror and a second galvanometer mirror according to an embodiment of the disclosure.

Referring to FIGS. 1 and 11, the laser beam L reflected by the second galvanometer mirror 212 may pass through the F-theta lens 300. The F-theta lens 300 may be disposed between the scanner 200 and the stage 400. The F-theta lens 300 may include lenses like the F-theta lens well known in the art. It should be understood, however, that the disclosure is not limited thereto. For example, the F-theta lens may be made up of a single lens having different refractive indices at different points, or may be made up of a single lens having the same refractive index.

The F-theta lens 300 may adjust the focal distance of the laser beam L to be constant, thereby focusing the laser beam L onto a region of the substrate S that is to be processed. The laser beam L having passed through the F-theta lens 300 may reach the substrate S.

Hereinafter, the optical path of the laser beam L according to the inclinations of the first galvano mirror 211 and the second galvano mirror 212 will be described in detail.

First, the optical path of the first laser beam L1 in case that the first galvanometer mirror 211 may have the first inclination and the second galvanometer mirror 212 may have the third inclination will be described. The first laser beam L1 may be incident on and may be reflected off the first galvanometer mirror 211 having the first inclination and may be incident on the second galvanometer mirror 212. In the drawings, a point on which the first laser beam L1 is incident may be denoted by PL1.

The first laser beam L1 incident on the second galvano mirror 212 having the third inclination may be reflected by the second galvano mirror 212 at the reflection angle equal to the incidence angle according to the law of reflection. The first laser beam L1 reflected by the second galvanometer mirror 212 may pass through the F-theta lens 300 to reach the substrate S. Specifically, it may reach P1, i.e., a point on an imaginary straight line SL1 on the substrate S. The line SL1 may be parallel to the second direction (x-axis direction).

Subsequently, the optical path of the second laser beam L2 in case that the first galvano mirror 211 may have the first inclination and the second galvano mirror 212 may have the same inclination as the second auxiliary line CL2 will be described.

Similar to the first laser beam L1, the second laser beam L2 may be incident on and may be reflected off the first galvano mirror 211 and may reach the point PL1 of the second galvano mirror 212. The second laser beam L2 incident on the second galvano mirror 212 may be reflected at the angle equal to the incidence angle according to the law of reflection. As the second galvano mirror 212 has the same inclination as the second auxiliary line CL2, the direction of the reflected laser beam L2 may be different from that of the first laser beam L1. The second laser beam L2 reflected from the second galvano mirror 212 may pass through the F-theta lens 300 and may reach a point P2 on the line SL1 existing on the substrate S. The point P2 may be spaced apart from the point P1 in the second direction (x-axis direction).

The optical path of the third laser beam L3 in case that the first galvanometer mirror 211 may have the first inclination and the second galvanometer mirror 212 may have the third inclination will be described.

Similar to the first laser beam L1, the third laser beam L3 may be incident on and may be reflected by the first galvano mirror 211 and may reach the point PL1 of the second galvano mirror 212. The third laser beam L3 incident on the second galvano mirror 212 may be reflected at the angle equal to the incidence angle according to the law of reflection. As the second galvano mirror 212 has the third inclination, the direction of the reflected laser beam L3 may be different from that of the first laser beam L1 and the second laser beam L2. The third laser beam L3 reflected from the second galvano mirror 212 may pass through the F-theta lens 300 and may reach a point P3 on the line SL1 existing on the substrate S. The point P3 may be further spaced apart from the point P1 in the second direction (x-axis direction).

The points on the substrate S where the first to third laser beams L1 to L3 reach may vary depending on the degree of rotation of the second galvanometer mirror 212. The second galvanometer mirror 212 can rotate continuously and accordingly the laser beam L may reach the substrate S through substantially all of the paths between the first laser beam L1 and the third laser beam L3. For example, the laser beam L may meet the substrate in all regions included in the imaginary line connecting the points P1 with P3. The imaginary line segment connecting the points P1 with P3 may become a first sub-scanning line SL1.

The optical path of the fourth laser beam L4 in case that the first galvanometer mirror 211 has the second inclination and the second galvanometer mirror 212 has the third inclination will be described.

The fourth laser beam L4 may be incident on and may be reflected off the first galvanometer mirror 211 having the second inclination and may be incident on the second galvanometer mirror 212. In the drawings, a point on which the fourth laser beam L4 is incident may be denoted by PL2.

The fourth laser beam L4 incident on the second galvano mirror 212 having the third inclination may be reflected by the second galvano mirror 212 at the reflection angle equal to the incidence angle according to the law of reflection. The fourth laser beam L4 reflected by the second galvanometer mirror 212 may pass through the F-theta lens 300 to reach the substrate S. Specifically, the fourth laser beam L4 may reach a point P4 on an imaginary straight line SL2 on the substrate S. The line SL2 may be parallel to the second direction (x-axis direction).

Subsequently, the optical path of the fifth laser beam L5 in case that the first galvano mirror 211 has the second inclination and the second galvano mirror 212 has the same inclination as the second auxiliary line CL2 will be described.

Similar to the fourth laser beam L4, the fifth laser beam L5 may be incident on and may be reflected by the first galvano mirror 211 and may reach the point PL2 of the second galvano mirror 212. The fifth laser beam L5 incident on the second galvano mirror 212 may be reflected at the angle equal to the incidence angle according to the law of reflection. As the second galvano mirror 212 has the same inclination as the second auxiliary line CL2, the direction of the reflected laser beam L5 may have different from that of the fourth laser beam L4. The fifth laser beam L5 reflected from the second galvano mirror 212 may pass through the F-theta lens 300 and may reach a point P5 on the line SL2 existing on the substrate S. The point P5 may be spaced apart from the point P4 in the second direction (x-axis direction).

The optical path of the sixth laser beam L6 in case that the first galvanometer mirror 211 has the second inclination and the second galvanometer mirror 212 has the third inclination will be described.

Similar to the fourth laser beam L4, the sixth laser beam L6 may be incident on and may be reflected by the first galvano mirror 211 and may reach the point PL2 of the second galvano mirror 212. The sixth laser beam L6 incident on the second galvano mirror 212 may be reflected at the angle equal to the incidence angle according to the law of reflection. As the second galvano mirror 212 has the third inclination, the direction of the reflected laser beam L6 may be different from that of each of the fourth laser beam L4 and the fifth laser beam L5. The sixth laser beam L6 reflected from the second galvano mirror 212 may pass through the F-theta lens 300 and may reach a point P6 on the line SL2 existing on the substrate S. The point P6 may be further spaced apart from the point P4 in the second direction (x-axis direction).

Since the second galvanometer mirror 212 can rotate continuously, in case that the first galvanometer mirror 211 has the first inclination, the laser beam L can travel along all of the paths between the fourth laser beam L4 and the sixth laser beam L6. In other words, the laser beam L can reach all the areas included in the imaginary line connecting the points P4 with P6. The imaginary line segment connecting the points P4 with P6 may become the second scanning line SL2.

The lengths of the first scanning line SL1 and the second scanning line SL2 may have determined by the rotation angle 2β of the second galvanometer mirror 212.

The first scanning line SL1 and the second scanning line SL2 may be spaced apart from each other in the first direction (y-axis direction). The spacing distance may be proportional to the angle 2α between the first inclination and the second inclination of the first galvanometer mirror 211 and the distance between the scanner 200 and the stage 400.

Figure 12:
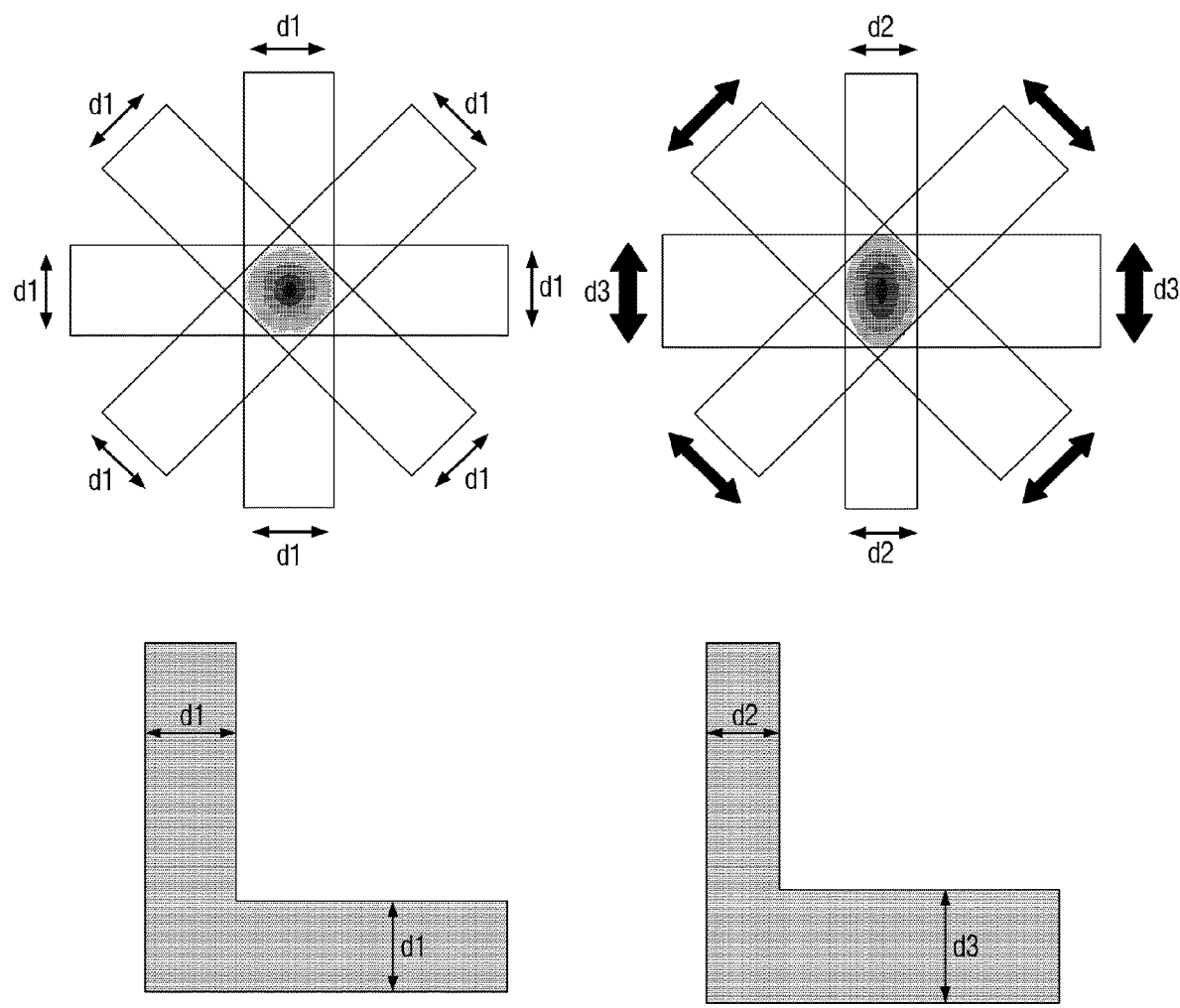
FIG. 12 is a schematic view for comparing the widths of the cross-sectional areas of light in different directions in case that the cross-section of a laser beam is a perfect circle with those in case that the cross-section of a laser beam is an ellipse.
Figure 13:
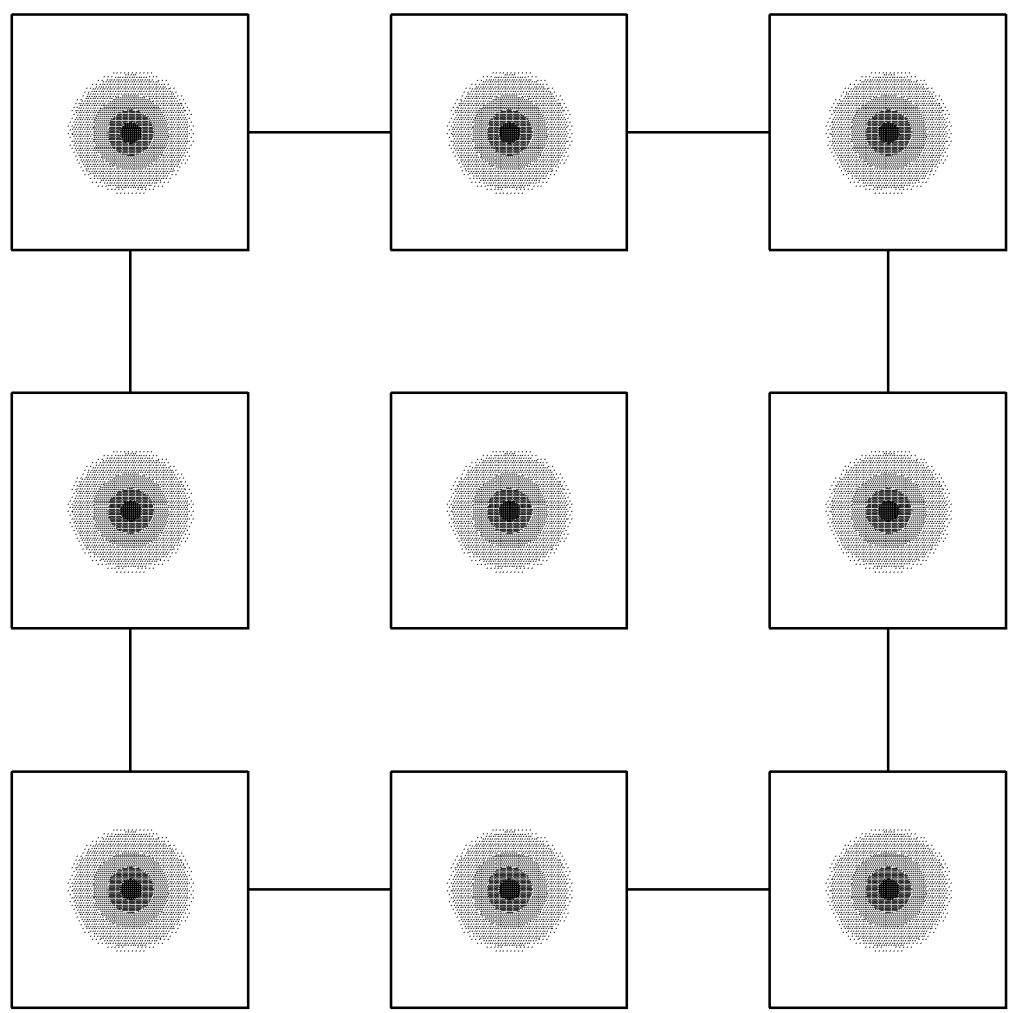
FIG. 13 is a schematic cross-sectional view of laser beams irradiated onto a substrate in case that a laser beam incident on a scanner has a perfect circular shape.
Figure 14:
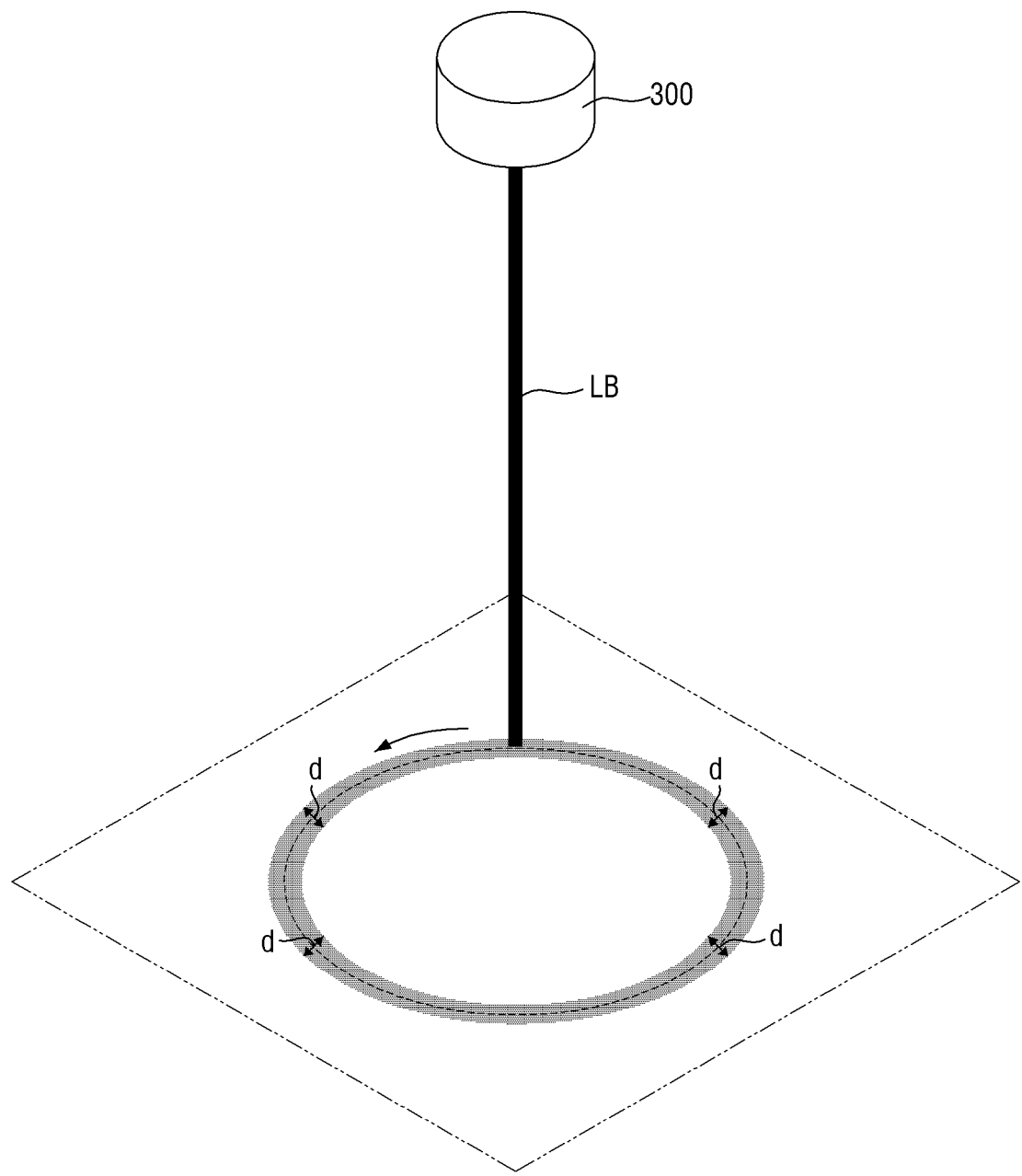
FIG. 14 is a schematic view illustrating a width of a laser beam irradiated onto a substrate in case that the cross section of the laser beam is a perfect circle.

FIG. 12 is a schematic view for comparing the widths of the cross-sectional areas of light in different directions in case that the cross-section of a laser beam is a perfect circle with those in case that the cross-section of a laser beam is an ellipse. FIG. 13 is a schematic cross-sectional view of laser beams irradiated onto a substrate in case that a laser beam incident on a scanner has a perfect circular shape. FIG. 14 is a schematic view illustrating a width of a laser beam irradiated onto a substrate in case that the cross section of the laser beam is a perfect circle.

Referring to FIG. 12, a laser beam L may be a kind of light, which is an aggregate of countless wavelengths, and thus may not have directivity in a particular direction. Therefore, the magnitude of energy transmitted by a laser beam L may be determined by the width of the cross-sectional area of the laser beam L unless it is polarized through a polarizing plate or the like.

As shown on the left side in FIG. 12, in case that the cross section of a laser beam L is a perfect circle, the laser beam may have the width d1 in both the horizontal and vertical directions as well as in the diagonal directions therebetween on the same plane as the cross section. Therefore, if a workpiece is processed into an L-shape using a laser beam having such a perfectly circular cross-section, the width of the laser irradiated onto the workpiece is all equal, i.e., d1 in the vertical and horizontal directions, so there may be no directivity. Therefore, by using a laser beam having a perfectly circular cross-section, it may be possible to process the workpiece efficiently without additional processing for different directions.

On the other hand, as shown on the right side in FIG. 12, in case that the cross-section of a laser beam L is an ellipse, the cross-sectional area may vary depending on the directions. For illustration, it may be assumed that a laser beam has a cross section in an elliptical shape with the major axis in the vertical direction and the minor axis in the horizontal direction as shown in FIG. 12. The vertical width of the laser beam on the same plane as the cross-section of the laser beam may be equal to d2. The horizontal width of the laser beam may be equal to d3 greater than d2. The width of the laser beam in the direction between the vertical direction and the horizontal direction may have a value between d2 and d3. Therefore, in case that a workpiece is processed into an L-shape using such a laser beam, the width of the laser beam applied to the workpiece may be narrower in the vertical direction than in the horizontal direction. Since the area and width of the region where the laser is irradiated may vary depending on the directions, there may be directivity during the processing of the laser beam. As such, in case that the cross section of the laser beam is an ellipse, there may be problems in that precise processing is not possible due to the directivity of the laser beam, or an additional design may be required for the directions.

Therefore, by adjusting a laser beam L having an elliptical cross-section into a laser beam L having a perfectly circular cross-section depending on the purpose of using the laser beam L, more efficiency processing may be possible using the laser beam L irradiated from the same laser source LS.

For a laser processing apparatus 10 that performs processing by changing the traveling paths of a laser beam L in a variety of ways directions, it may be advantages to use a laser beam L having a perfectly circular cross-section. Therefore, a laser beam L having an elliptical cross-section may be adjusted into a laser beam L having a perfectly circular cross-section by using the width adjuster 100. It should be understood, however, that the disclosure is not limited thereto. In some implementations, for example, different energies may be required for different paths of a laser beam, or an elliptical cross-section of a laser beam may be more advantageous than a perfectly circular cross-section. In such case, the cross section of the laser beam L may be adjusted from a perfect circle to an ellipse using the width adjuster 100. In the following description, it may be assumed that the cross section of the laser beam L is adjusted from an ellipse to a perfect circle by using the width adjuster 100.

Referring to FIGS. 13 and 14, in case that the laser beam L having an elliptical cross-section may be adjusted into a laser beam L having a perfectly circular cross-section using the width adjuster 100 according to the embodiment of the disclosure, the cross-section of the laser beam L reaching every location of the substrate S may be a perfect circle. As described above, the laser beam L having a perfectly circular cross-section has no directivity when viewed from the top (or in a plan view), it can still have the perfectly circular cross-section at every irradiation location even after it may be reflected off the scanner 200 and may be refracted by the F-theta lens 300. The diameter of the cross section of the laser beam L irradiated onto the substrate S may be defined as d. A stage 400 disposed under the substrate S may move in various directions when viewed from the top (or in a plan view) to cut the substrate S. Since the laser beam L having the perfectly circular cross-section has no directivity, the cross section of all of the laser beams L irradiated onto the substrate S is a perfect circle, and thus the width of the regions where the laser beams L are irradiated may be always equal to the diameter d of the laser beams L despite movement in different directions. Therefore, even in case that the cross section of the laser beam L irradiated by the laser source LS is an ellipse, it may be possible to irradiate the laser beam L with the same width and the same intensity onto all of the locations using the width adjuster 100. If the width and intensity of the laser beam L irradiated onto the substrate S are maintained constant, it may be possible to perform precise processing on the substrate S only by adjusting the movement of the stage 400 using the laser beam L.

Since the width adjusting portions 120 according to the embodiment has a focus at infinity, i.e., an infinite focal length, the width adjusting portions 120 may have no power. Therefore, the laser beams L incident on the width adjuster 100 including the width adjusting portions 120 at different portions all may exit in the direction parallel to the incident beams so that the exiting laser beams L all may travel in the direction parallel to one another. Accordingly, it may be possible to prevent an aberration such as Petzval field curvature even in case that each laser beam L is refracted while passing through the F-theta lens 300.

Figure 15:
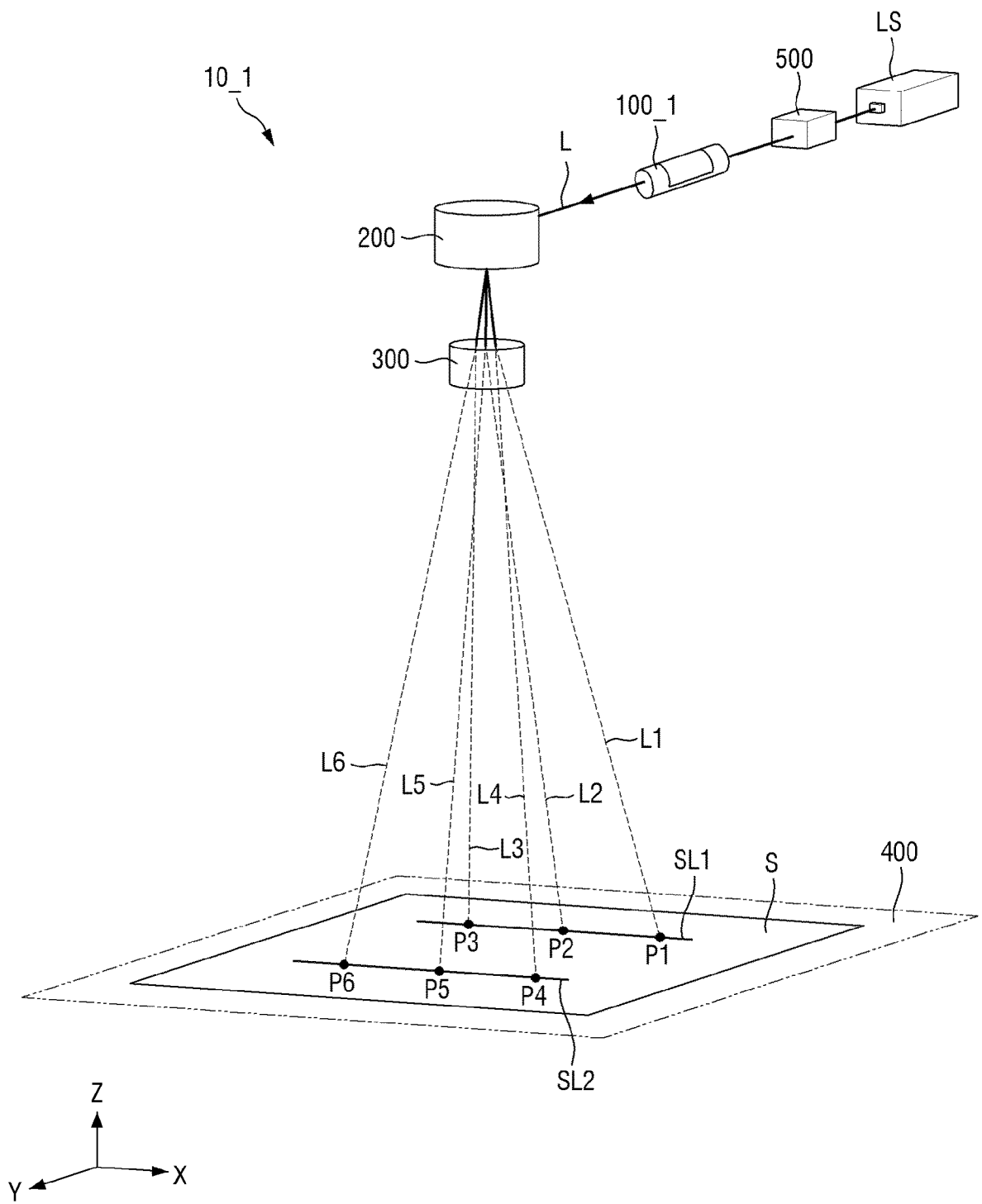
FIG. 15 is a schematic perspective view of a laser processing apparatus according to another embodiment of the disclosure.

FIG. 15 is a schematic perspective view of a laser processing apparatus according to another embodiment of the disclosure.

The embodiment is different from that of the embodiment of FIG. 1 at least in that a laser processing apparatus 10_1 may further include a beam expander 500 disposed between a laser source LS and a width adjuster 100_1, that a first width adjusting portion 121 and a second width adjusting portion 122_1 have different shapes, and that a concave surface of the first width adjusting portion 121 and a concave surface of the second width adjusting portion 122_1 face each other.

Referring to FIG. 15, the laser processing apparatus 10_1 may include a laser source LS for irradiating a laser beam L, a beam expander 500 for increasing the overall diameter of the laser beam L, a width adjustor 100_1 for adjusting the width of the cross section of the laser beam L, a scanner 200 for controlling the traveling direction of the laser beam L, an F-theta lens 300 for adjusting the focus of the laser beam L having passed through the scanner 200, and a stage 400 on which the substrate S is placed.

As shown in FIG. 15, a substrate S to be subjected to laser processing may be placed on the stage 400. The surface of the stage 400 may be parallel to the xy plane. The stage 400 can move in directions orthogonal to each other on the xy plane. For example, the stage 400 may move in x-axis and y-axis that are orthogonal to each other.

The laser source LS, the width adjusting portion 100, the scanner portion 200 and the F-theta lens 300 are disposed above the stage 400 (in the z-axis direction). For example, the F-theta lens 300 may be disposed above the stage 400 such that it is spaced apart from the stage 400 in the third direction (z-axis direction). The scanner 200 may be disposed above the F-theta lens 300 such that it is spaced apart from the F-theta lens 300 in the third direction (z-axis direction). The laser source LS, the beam expander 500 and the width adjuster 100 may be located at the same height as the scanner 200 from the plane of the stage 400. For example, the scanner 200, the width adjuster 100, the beam expander 500 and the laser source LS may be spaced apart from one another other in the second direction (x-axis direction) on the same xy plane, and may be arranged in the order of the scanner 200, the width adjuster 100, the beam expander 500 and the laser source LS. It should be understood, however, that the disclosure is not limited thereto. For example, the width adjuster 100 may be disposed higher than the scanner 200, the beam expander 500 may be disposed higher than the width adjuster 100, and the laser source LS may be disposed higher than the beam expander 500 from the plane of the stage 400. Even in this instance, the scanner 200, the width adjuster 100 and the beam expander 500 may be arranged on a single straight line.

The laser source LS, the scanner 200, the F-theta lens 300, the substrate S and the stage 400 may be identical to those described above; and, therefore, the redundant descriptions will be omitted.

The beam expander 500 may be disposed between the laser source LS and the width adjuster 100 to adjust the diameter of the laser transmitted to the width adjuster 100 and transmit it. The beam expander 500 may serve to increase the overall diameter of the laser output from the laser source LS having a small diameter. By doing so, the laser transmitted to the width adjuster 100 may adjust the relative size with the width adjusting portions 120 of the width adjuster 100. It should be noted that the diameter of the laser beam L which is increased through the beam expander 500 and is incident on the width adjuster 100 should be smaller than the diameter of the width adjusting portions 120.

Figure 16:
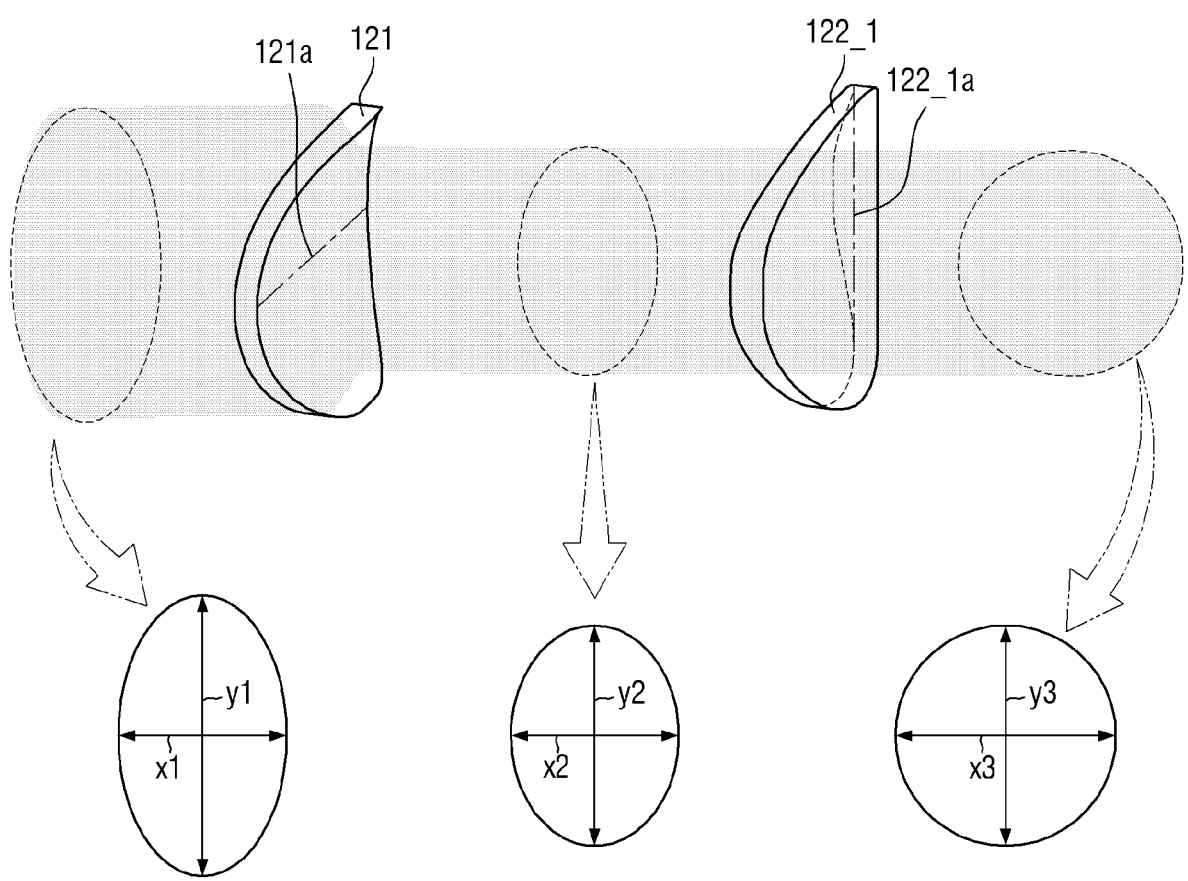
FIG. 16 is a schematic view showing the shapes of laser beams according to the arrangement of the width adjusting portions inside the barrel.

FIG. 16 is a schematic view showing the shapes of laser beams according to the arrangement of the width adjusting portions inside the barrel.

According to another embodiment, the first width adjusting portion 121 and the second width adjusting portion 122_1 may have different shapes and/or materials. Specifically, the refractive index of the concave surface of the first width adjusting portion 121 may be different from the refractive index of the concave surface of the second width adjusting portion 122_1, and the refractive index of the convex surface of the first width adjusting portion 121 may be different from the refractive index of the convex surface of the second width adjusting portion 122_1. It should be noted that even in this instance, both the first width adjusting portion 121 and the second width adjusting portion 122_1 having a focus at infinity, i.e., infinite focal length.

The first width adjusting portion 121 and the second width adjusting portion 122_1 may have different constituent materials and molecular structures. However, even in this instance, both the first width adjusting portion 121 and the second width adjusting portion 122_1 may be implemented as optical glass.

Since the width adjusting portion 120 according to the embodiment also has an infinite focal length and is optically transparent to transmit light, the laser beam L incident on the width adjusting portion 120 may be refracted twice and may exit in the same direction as the incidence direction. In case that the laser beam L is incident on the convex surface of the width adjusting portion 120 and exits through the concave surface, as described above, the refractive index of the width adjusting portion 120 is higher than that of air, so that the overall cross-sectional area of the laser beam L may be reduced. On the contrary, in case that the laser beam L is incident on the concave surface of the width adjusting portion 120 and exits through the convex surface, the overall cross-sectional area of the laser beam L may increase.

More specifically, it may be assumed that the concave surface of the first width adjusting portion 121 and the concave surface of the second width adjusting portion 122_1 face each other, and the reference line 121*a* of the first width adjustment portion 121 and the reference line 122_1*a* of the second width adjustment portion 122_1 are perpendicular to each other.

The laser beam L incident on the barrel may pass through the first width adjusting portion 121 and may be refracted, may contact in the vertical direction perpendicular to the reference line 121a, and may exit in the same direction as the incidence direction. Since the first width adjusting portion 121 has a focus at infinity, the laser incident on the first width adjusting portion 121 and the exiting laser may be parallel to each other. The laser beam L exiting from the first width adjusting portion may reach the second width adjusting portion 122_1. Unlike the first width adjusting portion 121, the second width adjusting portion 122_1 may have the concave surface disposed in the traveling path of the laser beam L. The laser beam L reaching the second width adjusting portion 122_1 may pass through the second width adjusting portion 122_1 and refracted, may expand in the horizontal direction perpendicular to the reference line 122_1a. For example, the cross-sectional area of the laser beam L exiting from the second width adjusting portion 122_1 may be larger than the cross-sectional area of the laser beam L incident on the second width adjusting portion 122_1. Since the second width adjusting portion 122_1 also has a focus at infinity like first width adjusting portion 121, the laser incident on the second width adjusting portion 122_1 and the exiting laser may be parallel to each other. As such, the laser beam L incident on the width adjuster 100 may contract once in the vertical direction and may expand once in the horizontal direction, and may exit parallel to the incidence direction. Therefore, a laser beam L having an elliptical cross-section with the major axis in the vertical direction and the minor axis in the horizontal direction may pass through the pair of the width adjusting portions 120, such that the major axis contracts while the minor axis expands. As a result, the laser beam L may have a perfectly circular cross-section.

For detailed description, a schematic cross-sectional view of the laser beam L incident on the barrel, a schematic cross-sectional view of the laser beam L after passing through the first width adjusting portion 121, and a schematic cross-sectional view of the laser beam L after passing through the second width adjusting portion 122_1 will be compared with one another. The length of the horizontal axis of the laser beam L incident on the barrel, i.e., x1 may be equal to the length of the horizontal axis of the laser beam L after passing through the first width adjusting portion 121, i.e., x2. The length of the horizontal axis of the laser beam L after passing through the second width adjusting portion 122_1, i.e., x3 may be greater than the values x1 and x2. The length of the vertical axis of the laser beam L incident on the barrel may have the greatest value, i.e., y1. The length of the vertical axis of the laser beam L after passing through the first width adjusting portion 121, i.e., y2 may be equal to the length of the vertical axis of the laser beam L after passing through the second width adjusting portion 122_1, i.e., y3.

According to this embodiment, the first width adjusting portion 121 and the second width adjusting portion 122_1 have different shapes and/or materials, and thus the amount of change in the width of the cross-sectional area of the laser beam L in case that it passes through the first width adjusting portion 121 may be different from the amount of change in the width of the cross-sectional area of the laser beam L in case that it passes through the second width adjusting portion 122_1.

Since the length of the horizontal axis of the laser beam L exiting through the above-described process is x3 and the length of the vertical axis is y3, x3 and y3 are adjusted to be the same value, so that the laser beam L having an elliptical cross-section may be adjusted into a laser bean L having a perfectly circular cross-section.

Although the reference lines 121a and 122_1a of the first width adjusting portion 121 and the second width adjusting portion 122_1 may be perpendicular to each other in the example shown in the drawing, this is merely illustrative. According to another embodiment, angles of the reference lines 121a and 122_1a of the first width adjusting portion 121 and the second width adjusting portion 122_1 can be adjusted in various ways in a laser processing apparatus 10_1, like the laser processing apparatus 10 according to the above-described embodiments.

Features of various embodiments of the disclosure may be combined partially or totally. As will be clearly appreciated by those skilled in the art, technically various interactions and operations are possible. Various embodiments can be practiced individually or in combination.

In concluding the detailed description, those skilled in the art will appreciate that many variations and modifications may be made to the embodiments without substantially departing from the principles of the disclosure. Therefore, the disclosed embodiments are used in a generic and descriptive sense only and not for purposes of limitation.

What is claimed is:

1. A laser processing apparatus comprising:
   a laser source;
   a width adjuster that adjusts a width of a laser beam irradiated from the laser source; and
   a scanner that adjusts an irradiation direction of the laser beam having passed through the width adjuster, wherein
   the width adjuster comprises a first width adjusting portion and a second width adjusting portion arranged on a traveling direction of the laser beam,
   a focal length of the first width adjusting portion is equal to or greater than about 20,000 mm, and
   a focal length of the second width adjusting portion is equal to or greater than about 20,000 mm.

2. The apparatus of claim 1, wherein the first width adjusting portion and the second width adjusting portion have a same shape and are made of a same material.

3. The apparatus of claim 2, further comprising:
   an F-theta lens that focuses the laser beam having passed through the scanner on a region to be processed.

4. The apparatus of claim 2, wherein
   each of the first width adjusting portion and the second width adjusting portion comprises a reference line, and
   the first width adjusting portion and the second width adjusting portion adjust a cross section of an incident laser beam in a direction perpendicular to the reference line.

5. The apparatus of claim 4, wherein
   each of the first width adjusting portion and the second width adjusting portion comprises a convex surface and a concave surface, and
   the convex surface and the concave surface have different curvatures.

6. The apparatus of claim 5, wherein
   the convex surface of the first width adjusting portion and the convex surface of the second width adjusting portion are arranged in a direction in which the laser beam is incident on the width adjuster, and
   the laser beam passes through the first width adjusting portion and the second width adjusting portion and contracts in a direction perpendicular to the reference line of the first width adjusting portion and the reference line of the second width adjusting portion.

7. The apparatus of claim 5, wherein
a radius of curvature of the convex surface in a range of about 23 mm to about 24 mm,
a radius of curvature of the concave surface in a range of about 19 mm to about 21 mm, and
each of a thickness of the first width adjusting portion and a thickness of the second width adjusting portion is in a range of about 9 mm to about 11 mm.

8. The apparatus of claim 4, wherein
the width adjuster comprises an opening, and
an arrangement of the first width adjusting portion and the second width adjusting portion is adjustable by the opening.

9. The apparatus of claim 8, wherein
the laser beam passes through the first width adjusting portion and the second width adjusting portion and contracts in a direction perpendicular to the reference line of the first width adjusting portion and the reference line of the second width adjusting portion, and
the cross section of the laser beam incident on the width adjuster is adjustable by adjusting the arrangement of the first width adjusting portion and an angle between the reference line of the first width adjusting portion and the reference line of the second width adjusting portion.

10. The apparatus of claim 2, further comprising:
a beam expander disposed between the laser source and the width adjuster to increase an overall diameter of the laser beam.

11. The apparatus of claim 10, wherein a cross-sectional area of the laser beam exiting from the beam expander in a direction perpendicular to the traveling direction is smaller than a cross-sectional area of each of the first width adjusting portion and the second width adjusting portion.

12. The apparatus of claim 1, wherein the first width adjusting portion and the second width adjusting portion have different shapes.

13. The apparatus of claim 12, wherein
each of the first width adjusting portion and the second width adjusting portion comprises a convex surface and a concave surface, and
the convex surface and the concave surface have different curvatures.

14. The apparatus of claim 13, wherein
the convex surface of the first width adjusting portion faces a direction in which the laser beam is incident on the width adjusting portion, and
the convex surface of the second width adjusting portion faces a direction in which the laser beam exits from the width adjuster.

15. The apparatus of claim 13, wherein
each of the first width adjusting portion and the second width adjusting portion comprises a reference line, and
the first width adjusting portion and the second width adjusting portion adjust a cross section of an incident laser beam in a direction perpendicular to the reference line.

16. The apparatus of claim 15, wherein
the first width adjusting portion contracts the cross section of the laser beam passing through the first width adjusting portion in a direction perpendicular to the reference line of the first width adjusting portion, and
the second width adjusting portion expands the cross section of the laser beam passing through the second width adjusting portion in a direction perpendicular to the reference line of the second width adjusting portion.

17. A laser processing method, comprising:
measuring a cross section of a laser beam;
analyzing the cross section of the laser beam to determine a direction of a major axis, a direction of a minor axis, and a ratio of the major axis to the minor axis; and
arranging a first width adjusting portion and a second width adjusting portion such that the first and second width adjust portions and a traveling direction of the laser beam intersect each other by adjusting relative angles between a reference line of the first width adjusting portion and a reference line of the second width adjusting portion and the major axis and the minor axis of the laser beam based on the directions of the major and minor axes and the ratio.

18. The method of claim 17, further comprising:
adjusting the cross section of the laser beam by irradiating the laser beam toward the first width adjusting portion and the second width adjusting portion after the arranging of the first width adjusting portion and the second width adjusting portion.

19. The method of claim 18, further comprising:
processing a workpiece by using the laser beam after the adjusting of the cross section of the laser beam.

20. The method of claim 17, further comprising:
disposing a scanner such that the scanner and the traveling direction of the laser beam intersect each other.

* * * * *